United States Patent [19]

Swanson

[11] Patent Number: 5,025,405
[45] Date of Patent: Jun. 18, 1991

[54] METHOD OF INTERPOLATING PIXEL VALUES

[75] Inventor: Roger W. Swanson, Loveland, Colo.

[73] Assignee: Hewlett-Packard Company, Palo Alto, Calif.

[21] Appl. No.: 421,298

[22] Filed: Oct. 11, 1989

Related U.S. Application Data

[63] Continuation of Ser. No. 316,568, Feb. 27, 1989, abandoned, which is a continuation of Ser. No. 897,182, Aug. 15, 1986, abandoned.

[51] Int. Cl.⁵ .................... G06F 7/38; G06F 15/00; G09G 1/06
[52] U.S. Cl. ................................ 364/723; 364/522; 340/728
[58] Field of Search ............... 364/723, 577, 474.31, 364/522; 340/728, 729, 793

[56] References Cited

U.S. PATENT DOCUMENTS

| | | | |
|---|---|---|---|
| 3,860,805 | 1/1975 | Strukel | 364/723 |
| 4,031,369 | 6/1977 | Heaman et al. | 364/723 |
| 4,428,059 | 1/1984 | Gessert | 364/723 |
| 4,550,383 | 10/1985 | Sugimoto | 364/723 |
| 4,590,465 | 5/1982 | Fuchs | 364/723 |

OTHER PUBLICATIONS

J. E. Bresenham, "Algorithm for Computer Control of a Digital Plotter", *IBM Systems Journal* (1965), pp. 25-30, of vol. 4, No. 4.

*Primary Examiner*—Dale M. Shaw
*Attorney, Agent, or Firm*—Edward L. Miller

[57] ABSTRACT

A pipelined interpolator precomputes both integer and fractional portions of the slope of the function to be interpolated. The fractional portions of the starting value of the dependent variable to be incremented and the fractional value of the slope by which the increment occurs are each scaled to allow integer arithmetic. The scaled fractional portion of the starting value of the dependent variable is offset by a constant to allow carry-outs to be detected with the comparison "greater than or equal to zero." The occurrence of a carry-out causes the (unscaled) integer portion of the dependent variable to be incremented by the (unscaled) integer portion of the slope. A selected one of two pairs of simultaneous integer additions on the sets of the integer portion and the scaled fractional portion of the dependent variable will be performed. One pair is selected when the carry-out from the scaled fractional portion did not occur. The other pair is selected when it did. The values produced by the selected pair of additions are fed to the next stage in the pipeline and allowed to actually update the dependent variable's integer and scaled fractional portions.

7 Claims, 26 Drawing Sheets

– SETUP DATA FLOW –

| STATE | ACTION | REF. MA12 |
|---|---|---|
| STSIDLE STSEDGE/STSFILL | $\sim$ SETUP[$Z_s$] $\rightarrow$ ADDS<br>$\sim$ SETUP [$Z_s$] $\rightarrow$ SEV<br>ADDS[$Z_e$] – NSETUP[$Z_s$] $\rightarrow$ ADDS<br>X – X [ S ] | $Z_s$<br>$Z_e - Z_s$ |
| STS2, STS3, STS4 | THESE STATES COMPARE<br>$\|X_e - X_s (\Delta S)\|$ WITH $\|Y_e - Y_s (\Delta Y)\|$ :<br>USES ADDS AND SOME<br>UNSHOWN CIRCUITRY | |
| STS5 | GREATER OF $\begin{cases} \|\text{ADDS }[\Delta X]\| \\ \text{OR} \\ \|\text{ADDS }[\Delta Y]\| \end{cases} \rightarrow$ COUNTS (DELTA MAX) | N |
| STS6A, STS6B, STS6C<br>STS6D, STS7B, STS7C | DIVIDE $\dfrac{\text{ADDS }[\Delta Z]}{\text{COUNTS[DELTA MAX]}}$ :<br>(1) QUOTIENT $\rightarrow$ SEI<br>(2) REMAINDER $\rightarrow$ ADDS( $\Delta$POS) | Mi |
| STS8 | ADDS[$\Delta$POS] $\rightarrow$ SEP | Mf |
| STS8A | ADDS[$\Delta$POS] – COUNTS[DELTA MAX] $\rightarrow$<br>ADDS($\Delta$NEG) | |
| STS9 | 2*ADDS[$\Delta$NEG] $\rightarrow$ SEM | Mf2 |
| STS9A | ADDS[$\Delta$NEG] + $\dfrac{\text{COUNT[DELTA MAX]}}{2} \rightarrow$ ADDS(ERROR) $\Delta$POS – $\dfrac{\text{DELTA MAX}}{2}$<br>(THIS IS THE SAME AS $\Delta$POS – $\dfrac{\text{DELTA MAX}}{2}$<br>2*ADDS[ERROR] | |
| STSA | 2*ADDS[ERROR] $\rightarrow$ SEE | Zf |

NOTE: ITEM[XXX] IS READ AS "ITEM CONTAINING XXX IS ...", WHILE (TEXT) IS A COMMENT

FIG 3

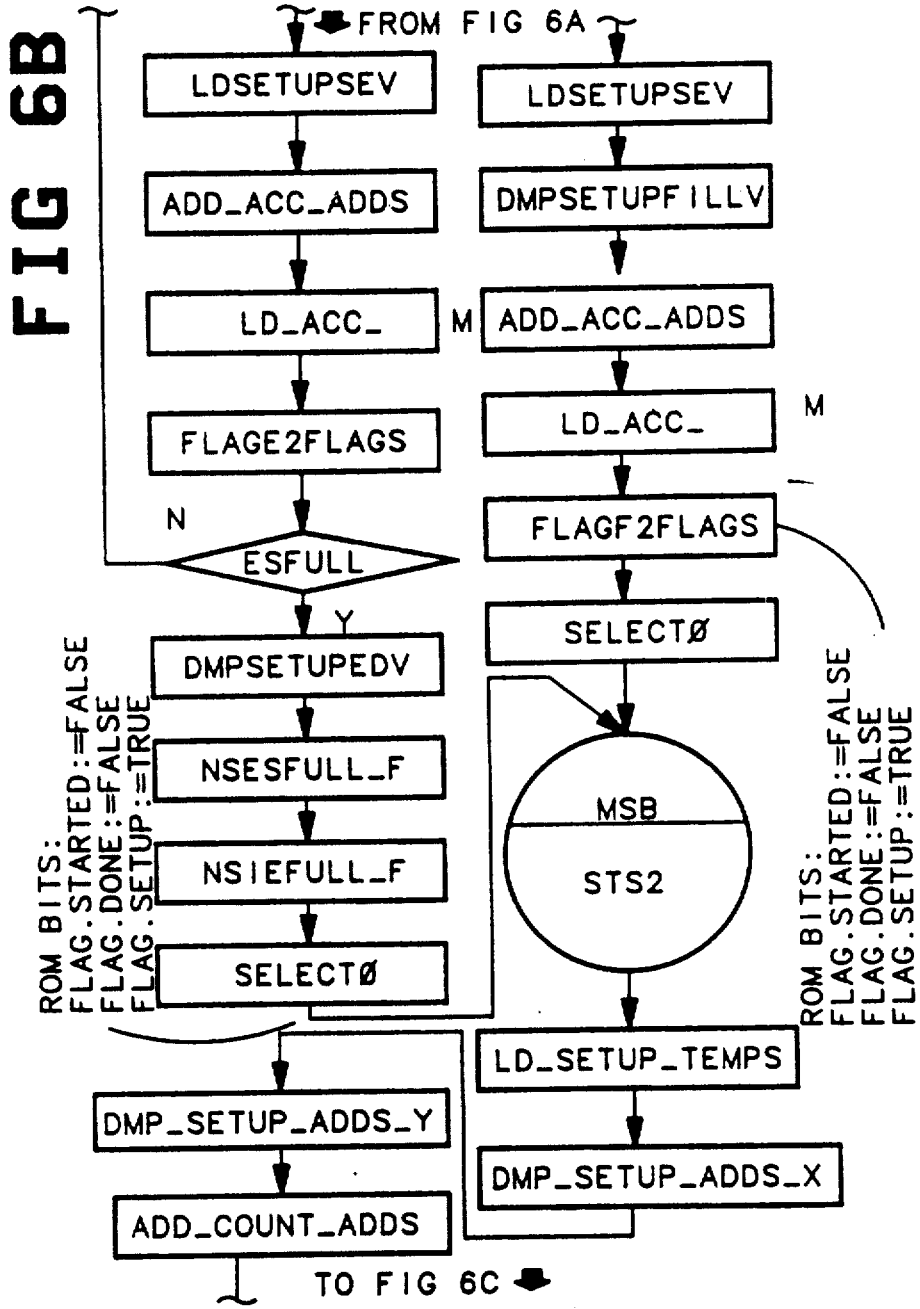

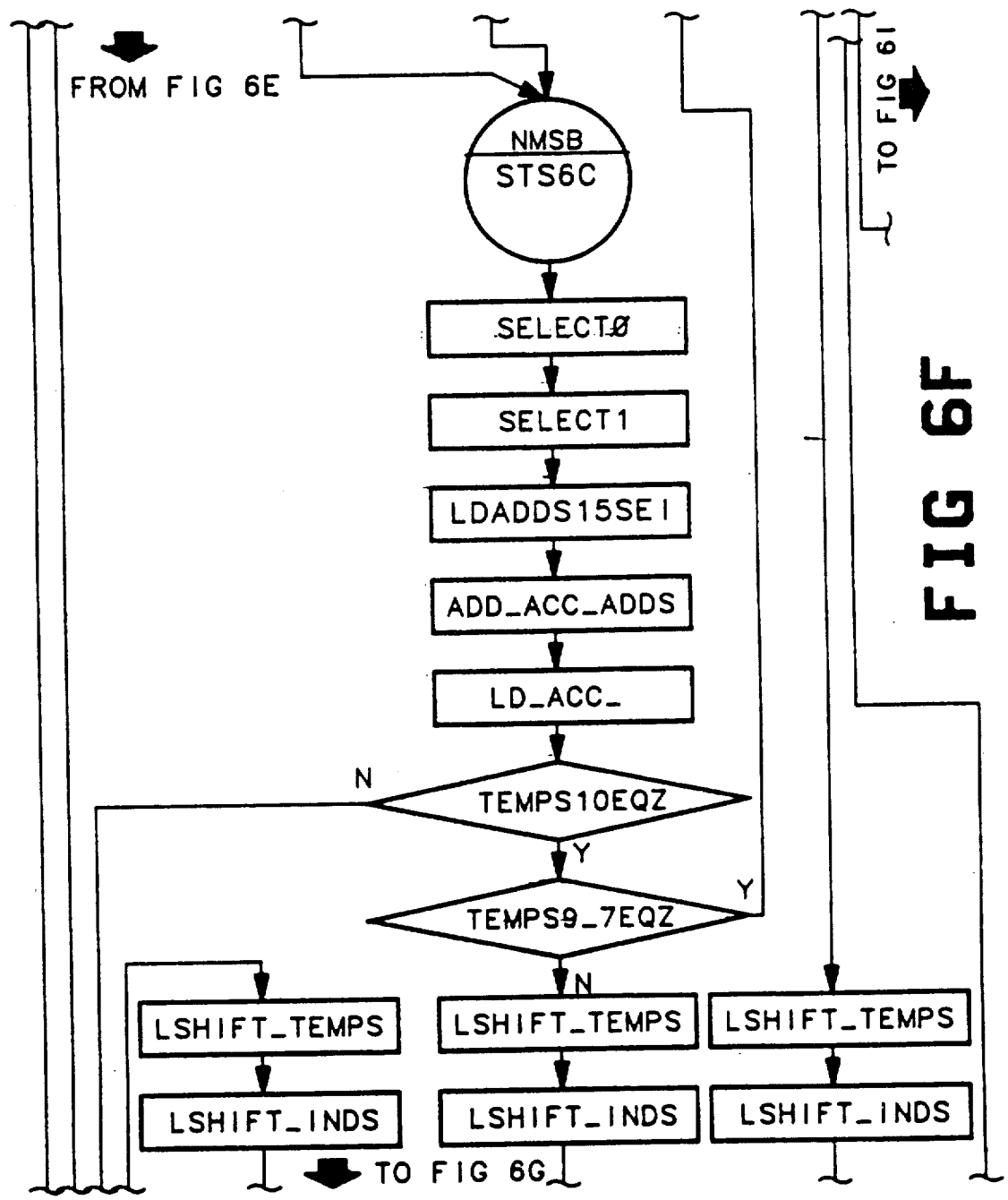

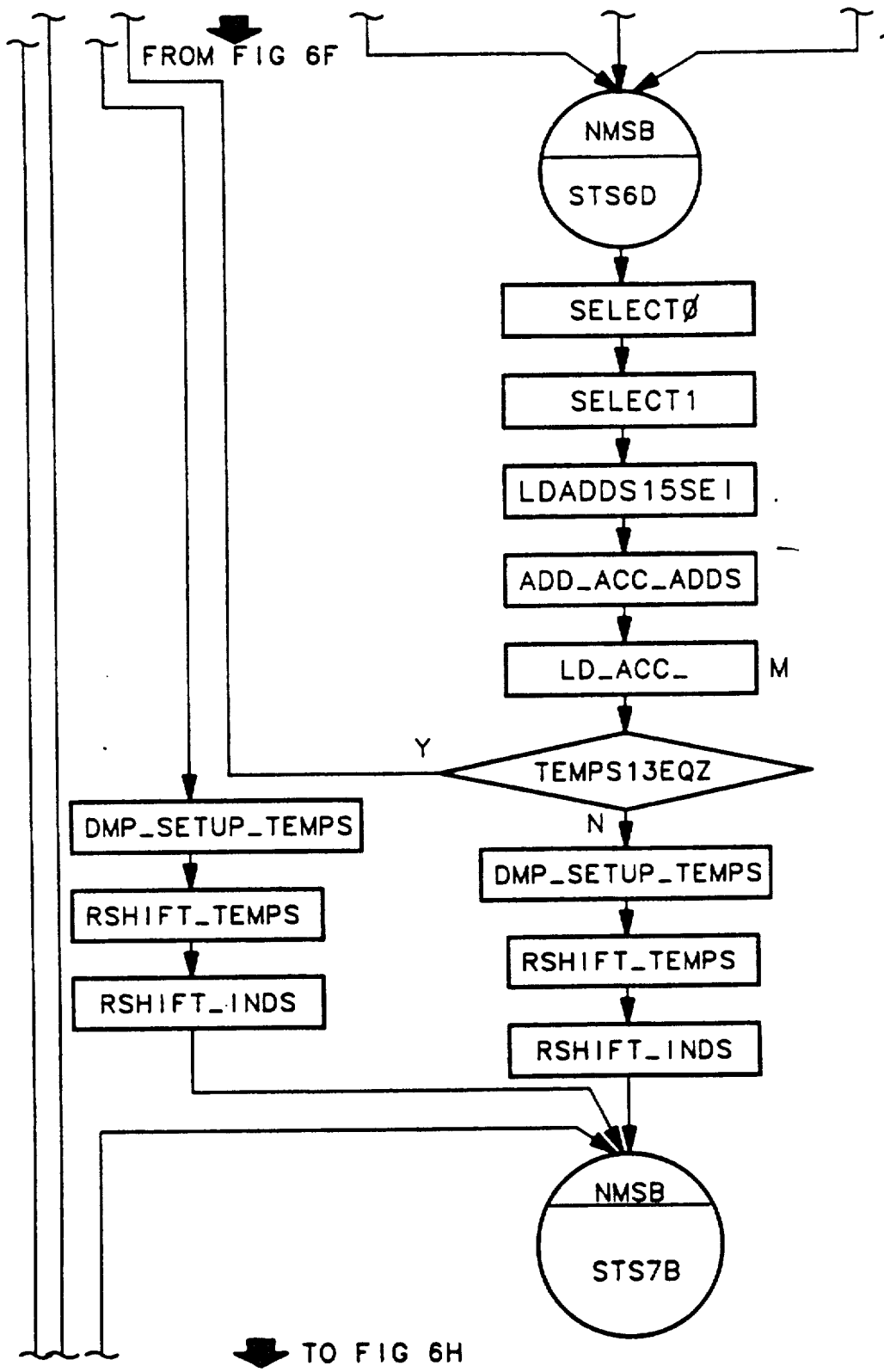

METHOD OF INTERPOLATING PIXEL VALUES

REFERENCE TO EARLIER FIELD APPLICATIONS

This patent is a continuation of an earlier copending application of the same title filed on Feb. 27, 1989, Ser. No. 07/316,568, by Roger W. Swanson, assignor to Hewlett-Packard Co. of Palo Alto, Calif. That copending application was in turn a copending continuation of an original patent application of the same title filed on Aug. 15, 1986, Ser. No. 06/897,182, by Roger W. Swanson. Both of the earlier filed applications are now abandoned.

BACKGROUND OF THE INVENTION

The graphics terminal of a Computer-Aided Engineering (CAE) workstation needs to produce accurate visual cues to the properties of an object if it is to adequately assist engineers in their designs. Typical properties include structure, shape, appearance, thermal gradients, and stress gradients. It is the function of the graphics subsystem of a CAE workstation to produce these images in a form that can be easily understood and manipulated.

With most methods of image synthesis, the image is generated by breaking the surfaces of the object into polygons, calculating the color and intensity values for each vertex, and drawing the results into a frame buffer while interpolating the color values across the polygon (Gouraud shading). The color information can be calculated from light source data or computed according to an analysis of a selected property.

The interpolation of coordinate and color (or intensity) values across each polygon must be performed quickly and accurately. This is accomplished by interpolating the coordinate value and color value of each quantized point (pixel) on the edges of the polygon and subsequently interpolating from edge to edge to generate the fill lines. If hidden surface removal with a Z buffer is required, then the depth (Z) value for each pixel must also be calculated. Furthermore, since color components can vary independently across a surfaces, values for red, green, and blue intensities must be interpolated independently. Thus, for a general purpose graphics system, a minimum of six different pixel values (X, Y, Z, Red, Green, and Blue) must be independently calculated when drawing polygons with Gouraud shading and interpolated Z values.

Generating the pixels and their values has traditionally been the bottleneck in image generation, because creating images at interactive speeds requires millions of pixels to be drawn per second. Alleviating the bottleneck requires an interpolation algorithm which can be implemented in hardware and extended to include six parameters. To maximize process overlap and minimize cost, it is desirable to have all components of the polygon rendering pipeline contained on a single chip.

The following disclosure describes a portion of a one-chip VLSI implementation of an interpolator (called the Polygon Rendering Chip, or PRC) capable of performing interpolated polygon fill with six parameters at rates up to twenty million pixels per second. Inputs for the PRC consist of polygon vertex data (X, Y, Z, R, G and B in form of 16-bit integers) and edge connectivity information fetched from an external dual-ported RAM. Its outputs are the X, Y, Z, R, G, and B data for each pixel. The PRC is capable of filling shaded polygons with over 2000 convex, concave, and/or crossing sides, and has an address space of $2^{15}$ by $2^{15}$ pixels.

The interpolation algorithm used in the PRC is related to the line-drawing algorithm described by Bresenham in the IBM Systems Journal, Vol. 4, No. 1, 1965. Unfortunately, Bresenham's algorithm imposes a restriction on the slope of the line to be interpolated. The lack of such a restriction, and the use of integer math for speed and ease of hardware implementation are among the distinguishing features of the new algorithm described herein, along with its VLSI implementation.

We shall briefly consider certain earlier line rendering interpolation algorithms. Each will be shown as a Pascal-like program. Unless otherwise noted, it will be assumed that X is the major axis and that its value increases. (It can be shown that by swapping X, Y and/or mirroring across the X and/or Y axis, any vector can be mapped into this assumption). Xs and Ys will be the starting values for X and Y. Xe and Ye will be the ending values for X and Y.

Digital Differential Analyzer

One prior art technique is the Digital Differential Analyzer (DDA). The DDA permits calculation of the Y value of a line without solving the equation $Y = M*X + C$ (requiring a multiplication) for each value of X. This is accomplished by computing the line differential, or slope (M), as the constant $(Ye-Ys)/(Xe-Xs)$. Once M has been computed, successive (X,Y) points can be generated by repeatedly incrementing X by one and adding M to Y. All Y values still need to be rounded to the nearest integer, but this is easily accomplished by adding 0.5 to the initial Y value and truncating each Y result. A down counter starting at Xe−Xs is also needed to detect the end of the line. Summarizing the above in program form we get:

```
PROCEDURE DDA1(Xs,Xe,Ys,Ye:INTEGER);
    VAR M,Y:REAL;
        N,X:INTEGER;
    BEGIN
    (* SETUP *)
    X := Xs;
    Y := Ys+.5;
    M := (Ye-Ys)/(Xe-Xs);
    N := (Xe-Xs);
    (* INTERPOLATION *)
    PLOT (X,INT(Y));
    WHILE N< >0
    DO BEGIN
        X := X+1;
        Y := Y+M;
        N := N-1;
        PLOT (X,INT(Y));
        END;
    END;
```

The main difficulties in using the DDA are the initial divide to generate M, and the need to use real or fractional binary numbers for M and Y. Not only is the division generally slow, but it is prone to round-off errors. The fractional part of M and Y must have a precision at least equal to the screen precision to be guaranteed of hitting the correct end point, and some empirical data suggest that the precision must be at least twice that of the screen's precision to correctly draw all the points in between.

Bresenham's Algorithm

The DDA can be split into integer and fractional parts. The integer part includes the count value N, the X value, and the integer part of the Y value. The fractional part includes only the fractional part of the Y value and all of the slope M. Since we initially assumed X to be the major axis, the slope (Ye−Ys)/(Xe−Xs) will always be less than or equal to one.

The only connection between the fractional values and the integer values is the carry from the Y-fractional part to the Y-integer part. As long as any integer values generated by adding the slope M to the Y-fractional part are transferred to the Y-integer part, the integer and fractional parts can be treated independently. This can be done by subtracting one from the Y-fractional part and adding one to the Y-integer part whenever the Y-fractional part is greater than or equal to one. Since comparing for a condition of greater than or equal to zero (sign bit interrogation) is usually easier than comparing for the condition of greater than or equal to one, one can be subtracted from the initial Y-fractional part and the comparison to zero can be used. Letting Yf represent the Y-fractional part, and Yi represent the Y-integer part, our program becomes:

```
PROCEDURE DDA2(Xs,Xe,Ys,Ye:INTEGER);
   VAR M,Yf:REAL;
       N,X,Yi:INTEGER;
   BEGIN
   (* SETUP *)
   X := Xs;
   Yi := Ys;
   Yf := −.5;
   M := (Ye−Ys)/(Xe−Xs);
   N := (Xe−Xs);
   (* INTERPOLATION *)
   PLOT (X,Yi);
   WHILE N< >0
   DO BEGIN
      X := X+1;
      Yf := Yf+M;
      IF Yf> =0
        THEN BEGIN
           Yf := Yf−1;
           Yi := Yi+1;
           END;
      N := N−1;
      Plot (X,Yi);
      END;
   END;
```

Since the values of the fractional parts are never used outside their own system of equations, they can all be scaled by the constant (2*(Xe−Xs). Only the boolean result of a compare for the condition of greater than or equal to zero is sent out. This has the result of eliminating the initial divide and converting all the fractional variables into integers. This is done without adding any multiplications other than by two, which can easily be accomplished with a left shift. Our program now becomes:

```
PROCEDURE BRESENHAM(Xs,Xe,Ys,Ye:INTEGER);
   VAR M,Yf,
       N,X,Yi:INTEGER;
   BEGIN
   (* SETUP *)
   X := Xs;
   Yi := Ys;
   Yf := −(Xe−Xs);
   M := 2*(Ye−Ys);
   N := (Xe−Xs);
   (* INTERPOLATION *)
   PLOT (X,Yi);
   WHILE N< >0
   DO BEGIN
      X := X+1;
      Yf := Yf+M;
      IF Yf> =0
        THEN BEGIN
           Yf := Yf−2* (Xe−Xs);
           Yi := Yi+1;
           END;
      N := N−1;
      PLOT (X,Yi);
      END;
   END;
```

The above program is essentially the same as the rules Bresenham presented in his original article.

When using Bresenham's algorithm in X and Y only, the major axis should always be defined as the axis of greatest delta, thus ensuring that a point will be plotted for each pixel along the major axis. When interpolating along the Z, Red, Green, or Blue axes, the X (or Y) axis should remain the major axis, even though its delta may be smaller than delta Z, delta Red, delta Green, and/or delta Blue. This is because the line is projected onto the X-Y plane. For example, it would be absurd to take thousands of steps along the Z axis when only a few pixels are to be drawn! This implies that the slope of the line in the X-Z plane, for example, may be greater than one, a condition which would exclude using the Bresenham algorithm.

One approach many have used to implement Z, Red, Green, and Blue interpolation is to return to the DDA, which doesn't require the slope to be between zero and one. They claim that slight inaccuracies arising from the DDA in the Z, Red, Green, and Blue values are not as critical as those in X and Y.

SUMMARY OF THE INVENTION

The method of the invention is to precompute both integer and fractional portions of the slope of the function to be interpolated. The fractional portion of the starting value of the dependent variable to be incremented, and the fractional value of the slope by which the increment occurs, are each scaled to allow integer arithmetic. The scaled fractional portion of the starting value of the dependent variable is offset by a constant to allow carry-outs to be detected with the comparison "greater than or equal to zero." The occurrence of a carry-out causes the (unscaled) integer portion of the dependent variable to be incremented by the (unscaled) integer portion of the slope.

Furthermore, a selected one of two pairs of simultaneous integer additions on the sets of the integer portion and the scaled fractional portion of the dependent variable will be performed. One pair is selected when the carry-out from the scaled fractional portion did not occur. The other pair is selected when it did. The values produced by the selected pair of additions are fed to the next stage in the pipeline and allowed to actually update the dependent-variable's integer and scaled fractional portions.

BRIEF DESCRIPTION OF THE DRAWINGS

FIG. 3 is a data flow diagram for the SETUP machine of FIG. 2.

DESCRIPTION OF THE PREFERRED METHOD

Figure 1:
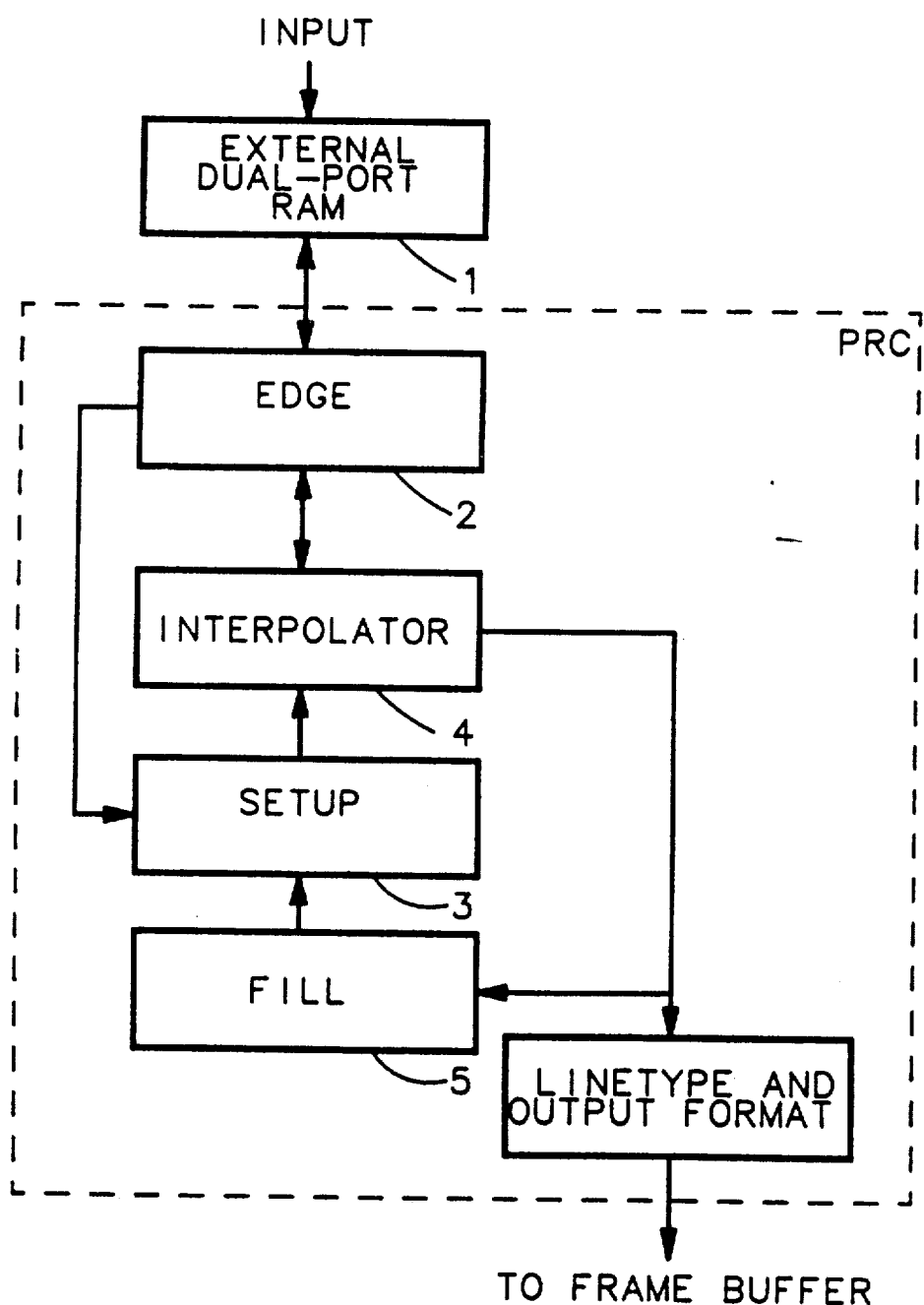
FIG. 1 is a simplified block diagram of the hardware used to implement the method of the invention.

A transformation similar to Bresenham's can be found that does not require the slope to be between zero and one. If the slope is unrestricted, then it will have an integer part and a fractional part which must be split up just as the Y value was. Modifying DDA1, we now get:

```
PROCEDURE DDA3(Xs,Xe,Zs,Ze:INTEGER);
    VAR Mf,Zf,
        N,Mi,X,Zi:INTEGER;
    BEGIN
    (* SETUP *)
    X := Xs;
    Zi := Zs;
    Zf := -.5;
    Mi := (Ze-Zs) DIV (Xe-Xs);
    Mf := FRACT((Ze-Zs)/(Xe-Xs));
    N := (Xe-Xs);
    (* INTERPOLATION *)
    PLOT (X,Zi);
    WHILE N<>0
    DO BEGIN
        X := X+1;
        Zi := Zi+Mi;
        Zf := Zf+Mf;
        IF Zf>=0
            THEN BEGIN
                Zf := Zf-1;
                Zi := Zi+1;
                END;
            N := N-1;
            PLOT (X,Zi);
            END;
    END;
```

As with DDA2, all fractional parts can be changed to integers by scaling with the constant 2*(Xe-Xs). The following Multiple-Axis Interpolator (MAI) assumes X to represent the major axis and Z to represent any of the other axes. Note that B MOD A = A*FRACT(B/A).

```
PROCEDURE MAI1(Xs,Xe,Zs,Ze:INTEGER);
    VAR Mf,Zf:REAL;
        N,Mi,X,Zi:INTEGER;
    BEGIN
    (* SETUP *)
    X := Xs;
    Zi := Zs;
    Zf := -(Xe-Xs);
    Mi := (Ze-Zs) DIV (Xe-Xs);
    Mf := 2*((Ze-Zs) MOD (Xe-Xs));
    N := (Xe-Xs);
    (* INTERPOLATION *)
    PLOT (X,Zi);
    WHILE N<>0
    DO BEGIN
        X := X+1;
        Zi := Zi+Mi;
        Zf := Zf+Mf;
        IF Zf>=0
            THEN BEGIN
            Zf := Zf-2*(Xe-Xs);
            Zi := Zi+1;
            END;
        N := N-1;
        PLOT (X,Zi);
        END;
    END;
```

At first glance, the MAI looks worse than the DDA. There is a DIV and a MOD function in the MAI, while the DDA has only one division. However, the DIV in the MAI is an integer division which is much simpler than the real division in the DDA. The MOD function is free, as this value is simply the remainder from the DIV done in the line above. Since the integer remainder is not thrown away, there is no round-off error as in the DDA. In a hardware implementation, the adders required for the Zi and Zf additions require the same, or fewer, bits than are required for the real value Z in the DDA.

Since all operations use simple integer arithmetic, the required resolution can be precisely specified. The needed resolution is determined by that of the delta terms (Xe-Xs and Ze-Zs), which require one bit more than the number of bits in the X or Z range. For example, if the desired X or Z range is 0 to 32767, then 16 bits of resolution are required with no loss of information. The above algorithm MAI1 can be modified to plot one pixel per clock period in a hardware implementation by rearranging parts of the setup segment and parts of the calculation in the interpolation loop, and then precomputing the constant Mf2.

```
PROCEDURE MAI2(Xs,Xe,Zs,Ze:INTEGER);
    VAR Mf,Zf:REAL;
        N,Mi,X,Zi:INTEGER;
    BEGIN
    (* SETUP *)
    X := Xs;
    Zi := Zs;
    Mi := (Ze-Zs) DIV (Xe-Xs);
    Mf := 2*((Ze-Zs) MOD (Xe-Xs));
    Mf2 := Mf-2*(Xe-Xs);
    Zf := -(Xe-Xs)+Mf;
    N := (Xe-Xs);
    (* INTERPOLATION *)
    PLOT (X,Zi);
    WHILE N<>0
    DO BEGIN
        X := X+1;
        IF Zf>=0
            THEN BEGIN
                Zf := Zf+Mf2;
                Zi := Zi+Mi+1;
                END
            ELSE BEGIN
                Zf := Zf+Mf;
                Zi := Zi+Mi;
                END;
            N := N-1;
            PLOT (X,Zi);
            END;
    END;
```

The interpolation loop can now generate values at a rate of one pixel per clock if two adders per axis are used; one for Zf and one for Zi. Since the data flow from the setup to the interpolation loop is unidirectional, the two routines can easily be pipelined using separate collections of circuitry. The entire setup procedure can be accomplished using one adder per parameter and doing a shift-and-add type divide in 20 to 34 clocks. Since various data show the typical fill vector length to be about 30 pixels, there is a good speed match between the setup and the pixel drawing; thus there is little need for any special divide hardware. The values of certain relationships ("short term constants") needed for interpolation are calculated in a SETUP machine in the PRC. Pixel drawing takes place in an INTERPOLATOR machine.

Six interpolators are used in the PRC. Even though one of X or Y could always be handled with an up-/down counter, extra bookkeeping would be required to keep track of which parameter was where and the routing of the chip would be more complex. Adding another copy of the INTERPOLATOR machine running in parallel with the other axis is a much simpler solution.

Polygon Fill Functions

Referring now to FIG. 1, the PRC begins a polygon fill process by reading an instruction and a pointer out of an external dual-ported RAM 1. The instruction indicates what kind of figure (polygon or vector) is to be drawn and if a linetype pattern is to be used. The pointer indicates the location of the first edge data packet for the polygon. Each packet contains a pointer to the next packet.

The first pointer is passed to the EDGE machine 2. The EDGE machine 2 builds up an ordered list of active edges (in the order to be used) and then reads the data packets of the first two edges to be drawn. As they are read, they are passed to the SETUP machine 3 and then on to the INTERPOLATOR 4. When the INTERPOLATOR machine 4 finishes one scan line of each edge, the packets are passed back to the EDGE machine 2.

If there are only two active edges, they are both stored in registers in the EDGE machine. If there are more than two active edges, EDGE swaps the appropriate edges in and out of the external dual-ported RAM. EDGE also dynamically maintains the active edge list, adding edges as the current scan line reaches them, and deleting edges as they are completed. EDGE will also re-sort the order of the active edge list whenever two edges cross. This permits the drawing of non-planar, concave, twisted polygons which may contain holes.

As the INTERPOLATOR 4 steps along each edge, the output is sampled by the FILL machine 5. The FILL machine saves the starting and ending points of each edge's contribution to the scan line. From these, it will generate fill vectors which are passed on to SETUP. FILL also needs to keep track of whether or not each edge is just starting or ending so as to properly handle vertices. Since EDGE, FILL, INTERPOLATOR, and SETUP are all pipelined, the setup of the fill vector will happen in parallel with the interpolation of the next edge segment.

Pixel Interpolation

The block diagram of FIG. 1 illustrates the relationship between the several subfunctions performed within the PRC. The method of the invention resides primarily in the SETUP machine 3 and the INTERPOLATOR machine 4. In one actual realization, the PRC contains six instances of each machine; one instance of each for each of X, Y, Z, Red, Green, and Blue. In operation, the PRC will choose the larger of (Xe−Xs) and (Ye−Ys) in determining the major axis. We will assume now, for the sake of explanation, that X will be chosen as the major axis. The PRC's six INTERPOLATOR machines and their associated SETUP machines would then interpolate each remaining parameter against increasing or decreasing values of X from Xs to Xe. The results describe how those parameters vary as a function X. Among those parameters is Y. The X's with the resulting succession of Y's are ultimately used as addresses in the frame buffer for storing the interpolated value of Z and interpolated values of the colors. An X-X combination is also employed, which effectively degenerates into a counter used to traverse the major axis, which we are assuming to be X. (If Y were to be the major axis, then a Y-Y combination would serve as a counter to traverse Y.) As a further aid in simplifying the explanation that follows, we shall limit our attention to the SETUP and INTERPOLATION machines that find the Z values as a function of X; the corresponsing machines for the other parameters are identical in their respective operation.

Briefly, the X-X combination either increments or decrements the X value to traverse the major axis. For each resulting new value of X we wish to find an associated Z (and a Y, and a Red, etc.). The Z SETUP machine operates in conjunction with the Z INTERPOLATOR machine to produce the needed sequence of Z values. All of the machines for the various parameters run in synchronism with the X machines, allowing the subsequent simultaneous pairings of X's with Z's, X's with Y's, X's with Red's, etc. To examine how Z is interpolated as a function of X we thus need only examine the instances of the Z machines, and not some "X-Z" machines.

Figure 2:
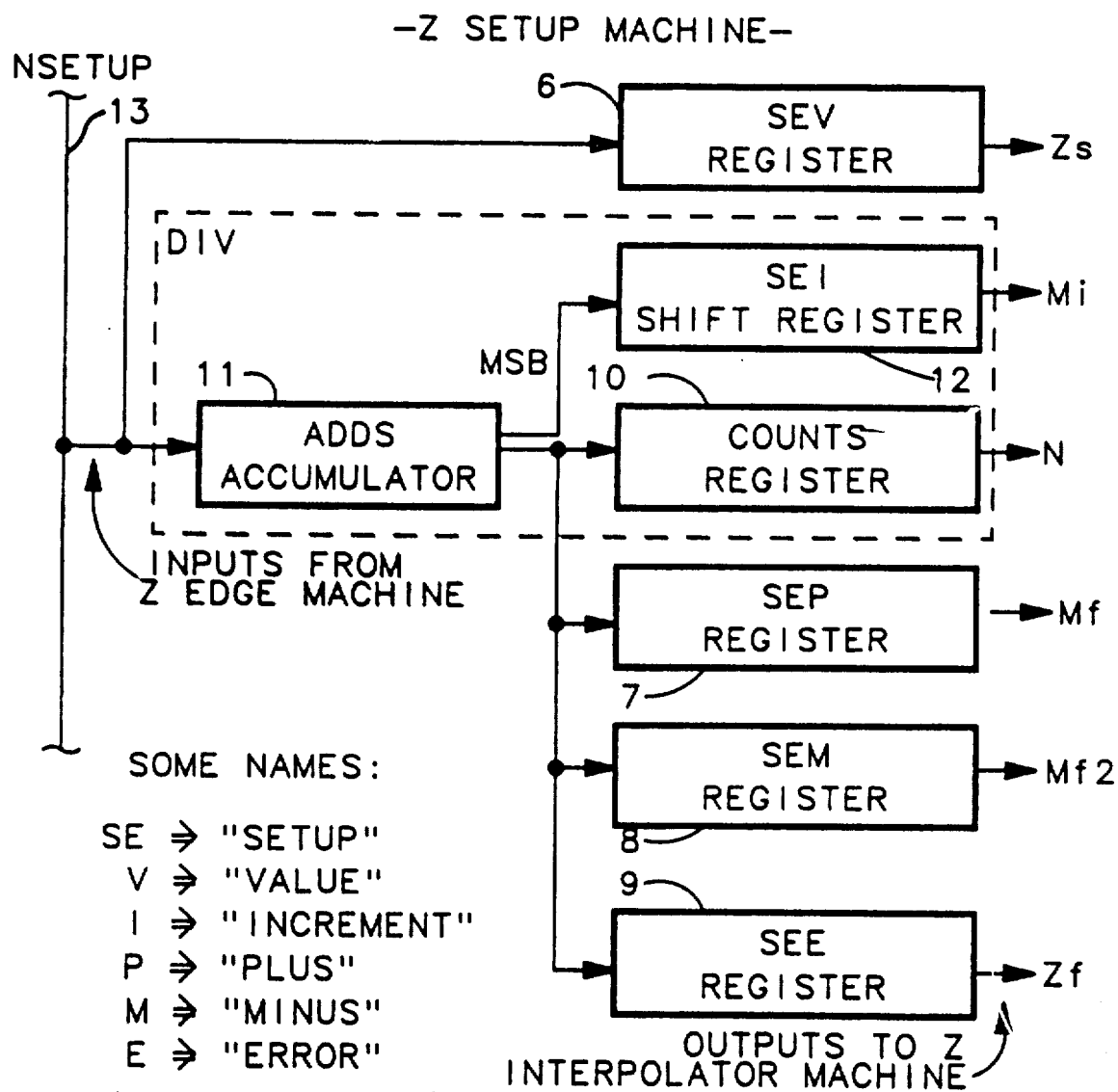
FIG. 2 is a block diagram of a SETUP machine used in a preferred practice of the method.

Referring now to FIG. 2, shown therein is a simplified block diagram of the SETUP machine 3 of FIG. 1. The block diagram of FIG. 2 to be described below implements the (*SETUP*) segment of the procedure MAI2 shown above To that end, FIG. 2 includes registers SEV 6, SEP 7, SEM 8, SEE 9, and COUNTS 10. Also included is an accumulator ADDS 11 and a shift register SEI 12.

Some simplified interconnections are shown between the various elements of the figure for the purpose of illustrating the overall function that the SETUP machine is to accomplish. Many instructions and interconnecting busses are involved, and not all are shown. The exact nature of these will be described in more detail further on below.

At this point it is sufficient to observe that the inputs to the Z instance of the SETUP machine come from the Z EDGE machine, and are treated as follows. The value Zs (Z-start) is loaded into SEV 6, and Zs and Ze (start and end for Z) are each sent to the accumuator ADDS 11, where their difference is found. The resulting outputs from the SETUP machine are as shown in the figure.

The registers SEI 12 and COUNTS 10, along with the accumulator ADDS 11, all of which are shown in the box marked DIV, accomplish the DIV and MOD operations of the segment (*SETUP*) in MAI2. This is done through the use of a conventional shift and add or subtract division algorithm.

Referring now to FIG. 3, shown therein is the exact flow of data through the Z SETUP machine. The figure makes reference to states in a state machine shown in FIG. 6, and also provides references to the variable names used in the MAI2 description of inventive method.

Figure 4:
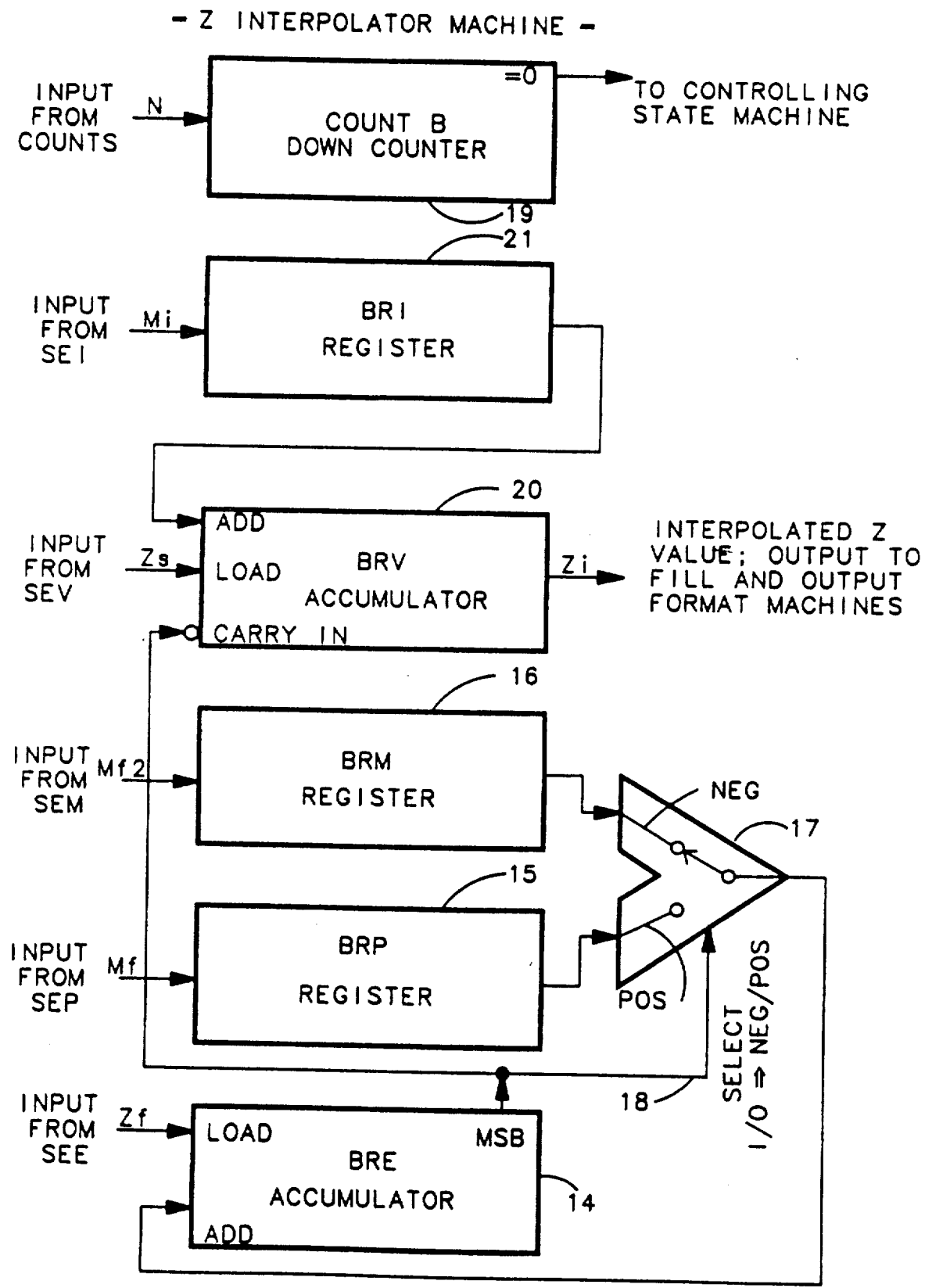
FIG. 4 is a block diagram of an INTERPOLATOR machine use 6 in a preferred practice of the method.

Referring now to FIG. 4, it may be seen how the INTERPOLATOR machine 4 of FIG. 1 operates upon the outputs of the SETUP machine of FIG. 2 to implement the (*INTERPOLATION*) segment of the procedure MA12. As with FIG. 2, only simplified interconnection and instruction information is depicted. More detail concerning those topics is presented in FIG. 7, where the state machine controlling the INTERPOLATOR machine is itself described.

Specifically, the lines of code "$Zf:=Zf+Mf2$" and "$Zf:=Zf+Mf$" are accomplished by an accumulator BRE 14, registers BRP 15 and BRM 16, in conjunction with a selector 17 controlled by a signal SELECT 18 representing the most significant bit (MSB) of the BRE accumulator 14. Since these lines of code appear as parts of THEN and ELSE clauses, only one of the lines is to be performed at any one time; which one is determined by the MSB of the BRE accumulator 14. With that in mind, it may be seen from an inspection of the figure that BRE 14 adds the contents of itself to those of either BRM 16 or BRP 15, and leaves that sum within itself in preparation for the next such addition. The MSB of BRE corresponds to the "IF $Zf>=0$" in MA12; if the MSB is a one do the "ELSE," and if the MSB is a zero do the "THEN."

For this series of additions Zf, Mf and Mf2 are initial values that are loaded one time for each vector to be interpolated. The associated value of N is also initially loaded into COUNTB 19 at the start of each vector's interpolation. COUNTB decrements that value once each time the accumulator BRE 14 generates a new sum. The addition action described above continues repeatedly upon those initial values until the count in COUNTB 19 equals zero.

From inspection of MA12 it can be seen that when Mf2 is added to Zf then we must also do "$Zi:=Zi+Mi+1$," or else we must do only "$Zi:=Zi+Mi$." In either case Mi is added to Zi. That is accomplished by register BRI 21 coupling its contents (Mi) into the accumulator BRV 20 (whose initial contents were Zs, or the start value of the Zi's). The difference between the two cases is achieved by the presence or absence of a carry-in to the BRV accumulator 20, which in turn is controlled by the MSB 18 of accumulator BRE 14. Recall that the value of MSB 18 corresponds to the "IF $Zf>=0$" condition, which in turn selects whether the additional "+1" is to be included. As before, these repeated additions proceed until the contents of COUNTB 19 reach zero.

Figure 5:
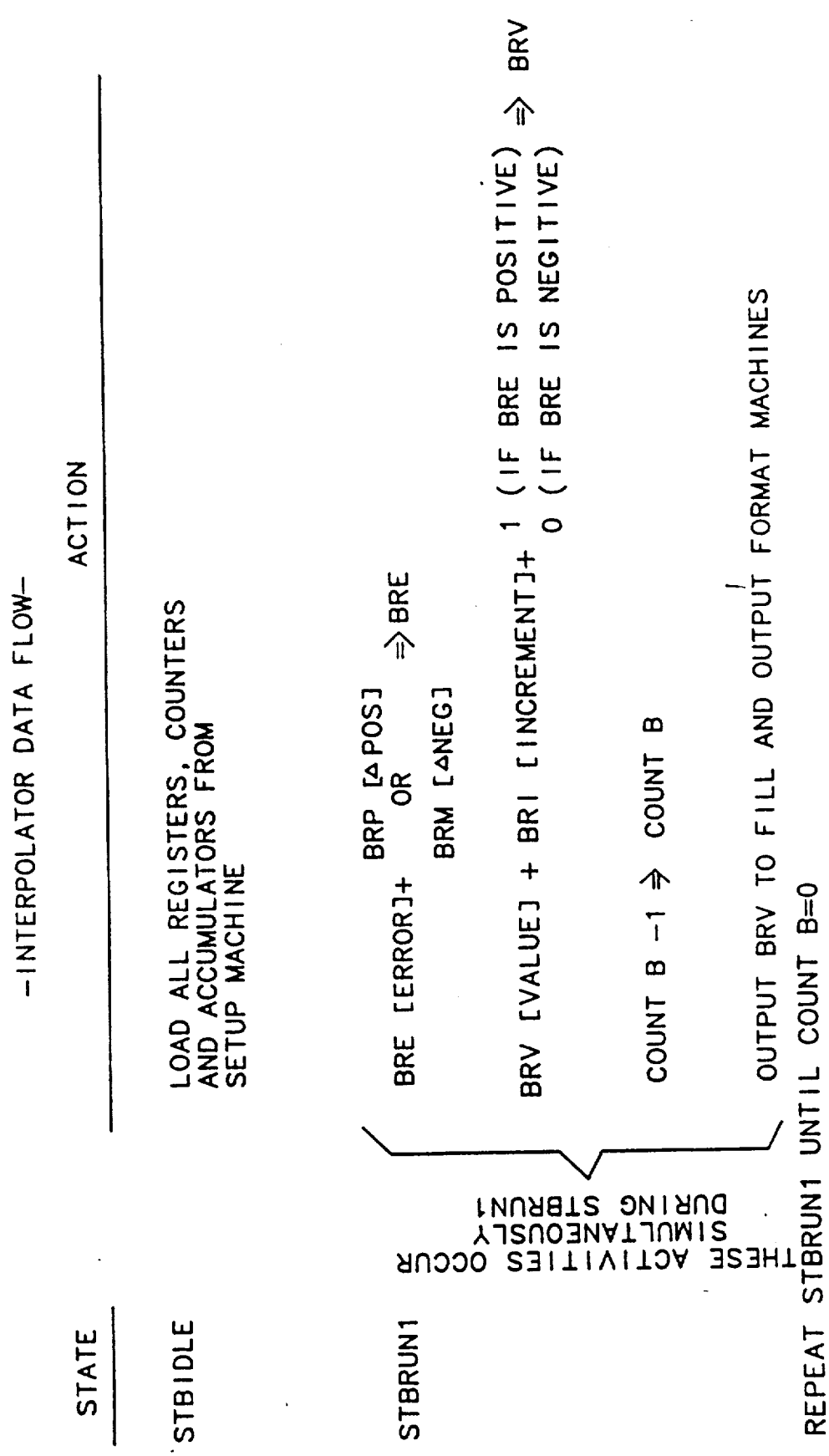
FIG. 5 is a data flow diagram for the INTERPOLATOR machine of FIG. 4.

The above-described sequence of events is also set out in a more symbolic form in the data flow diagram of FIG. 5.

Refer now to Appendix A and Appendix B. Although somewhat stylized in format, they are nevertheless complete descriptions of how the various registers and accumulators of FIGS. 2 and 4 were actually interconnected in one preferred implementation of the method.

These appendices are hardware interconnect diagrams describing possible data flow paths. They do not expressly show what instructions exist, nor the sequence in which they are issued. In a great many instances, however, the existence of an instruction can be readily inferred from the nature of the interconnection. For example, if register SEM can be set by bus NSETUP, then there must exist a "Set SEM from NSETUP" instruction.

Appendix A describes intra connections within the six sets of EDGE, SETUP, INTERPOLATOR, FILL and LINETYPE/FORMAT machines. That is, a connection or capability recited in Appendix A is to be understood as existing six times, once for each set of hardware in this list: X, Y, Z, Red, Green, and Blue. In contrast, Appendix B pertains mostly to overall control and bookkeeping, and exists as only a single instance.

Figure 7:
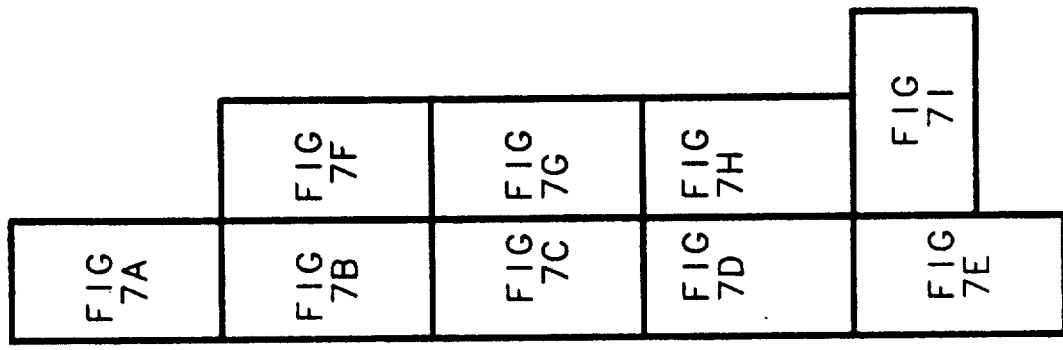
FIG. 7 is a state diagram of a state machine that controls the operation of the INTERPOLATOR machine of FIG. 4.
Figure 6:
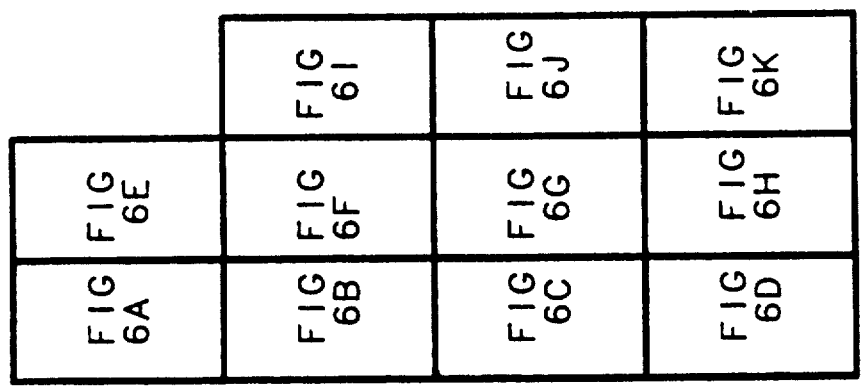
FIG. 6 is a state diagram of a state machine that controls the operation of the SETUP machine of FIG. 2.
Figure 6A:
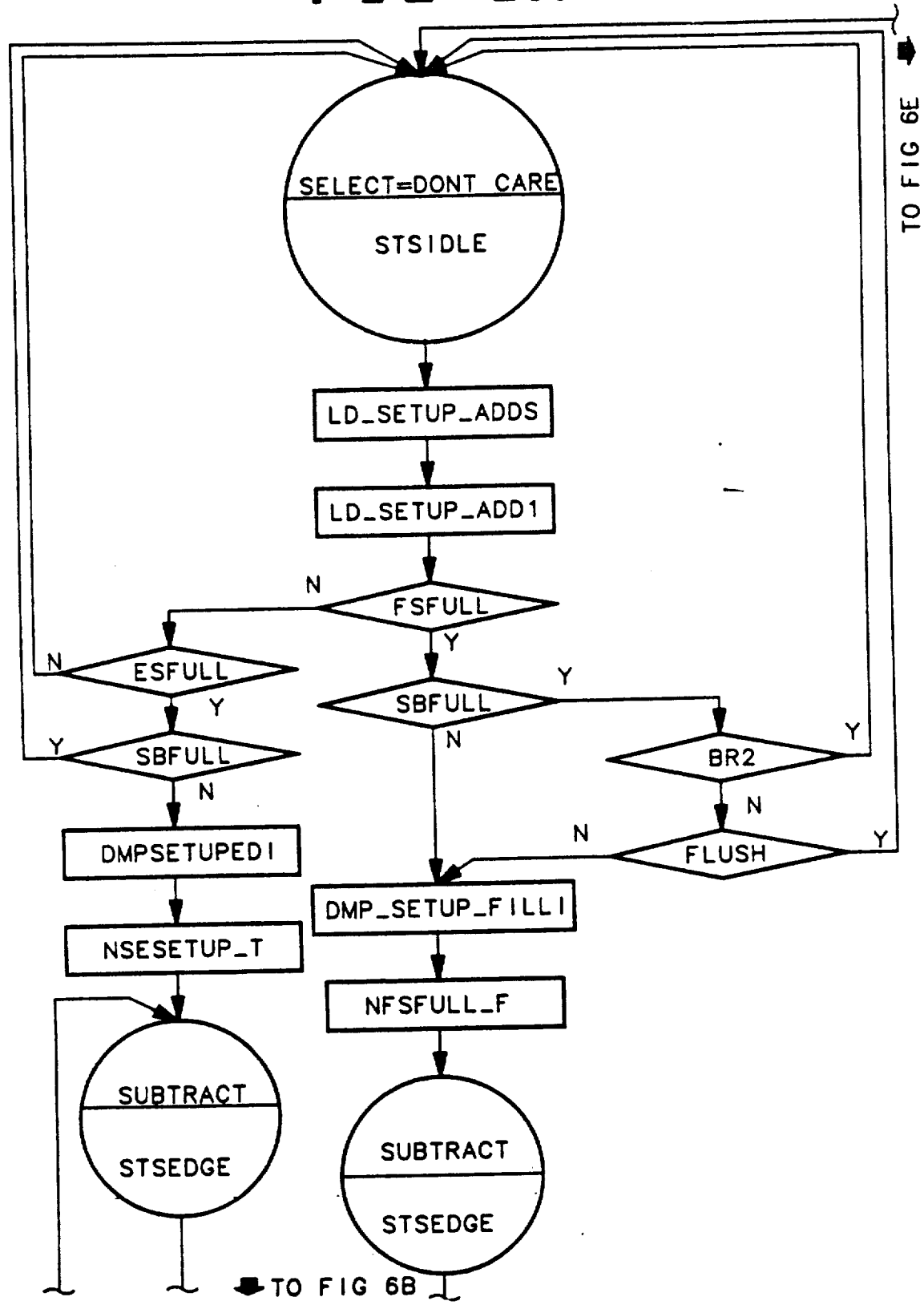
Figure 6C:
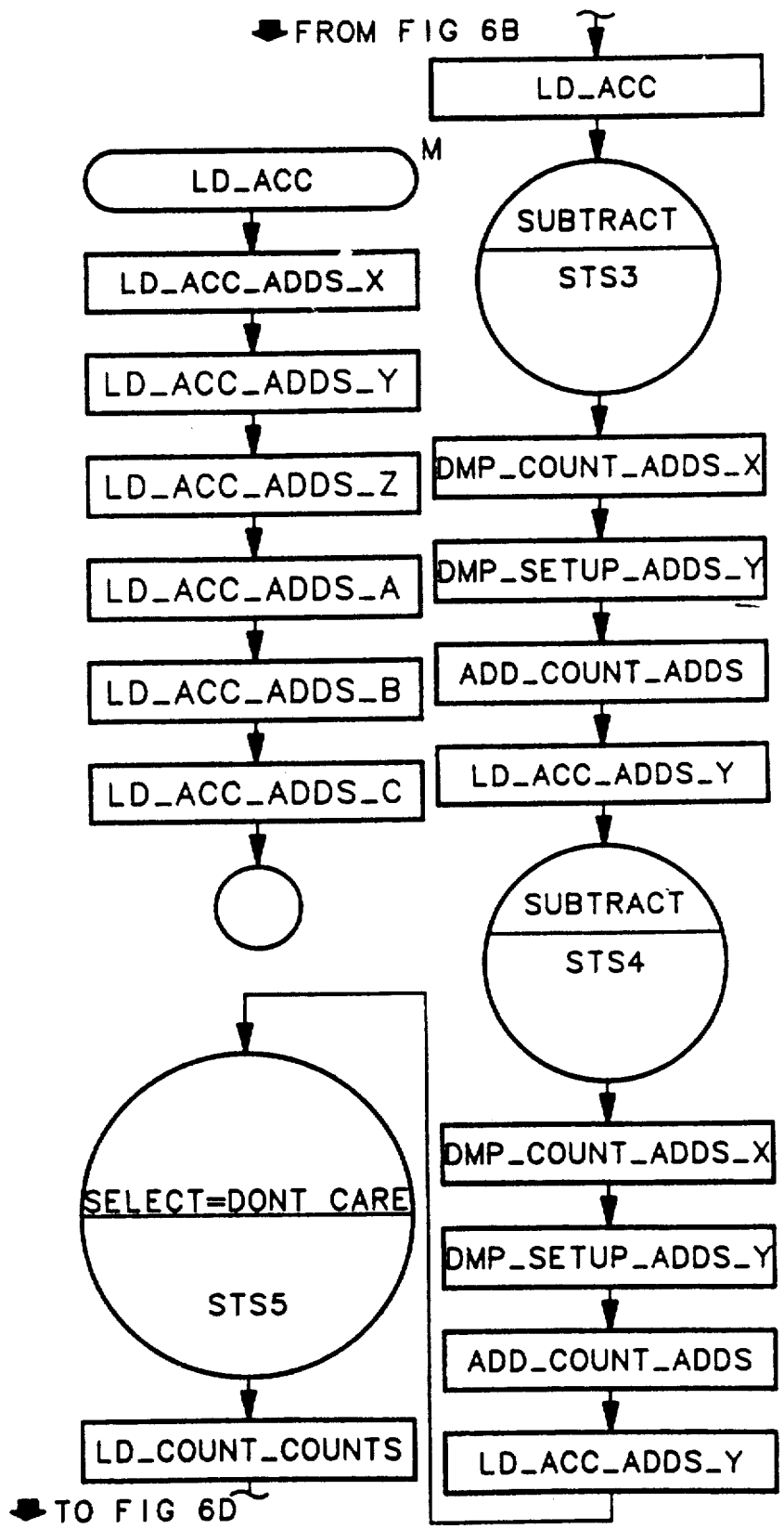
Figure 6D:
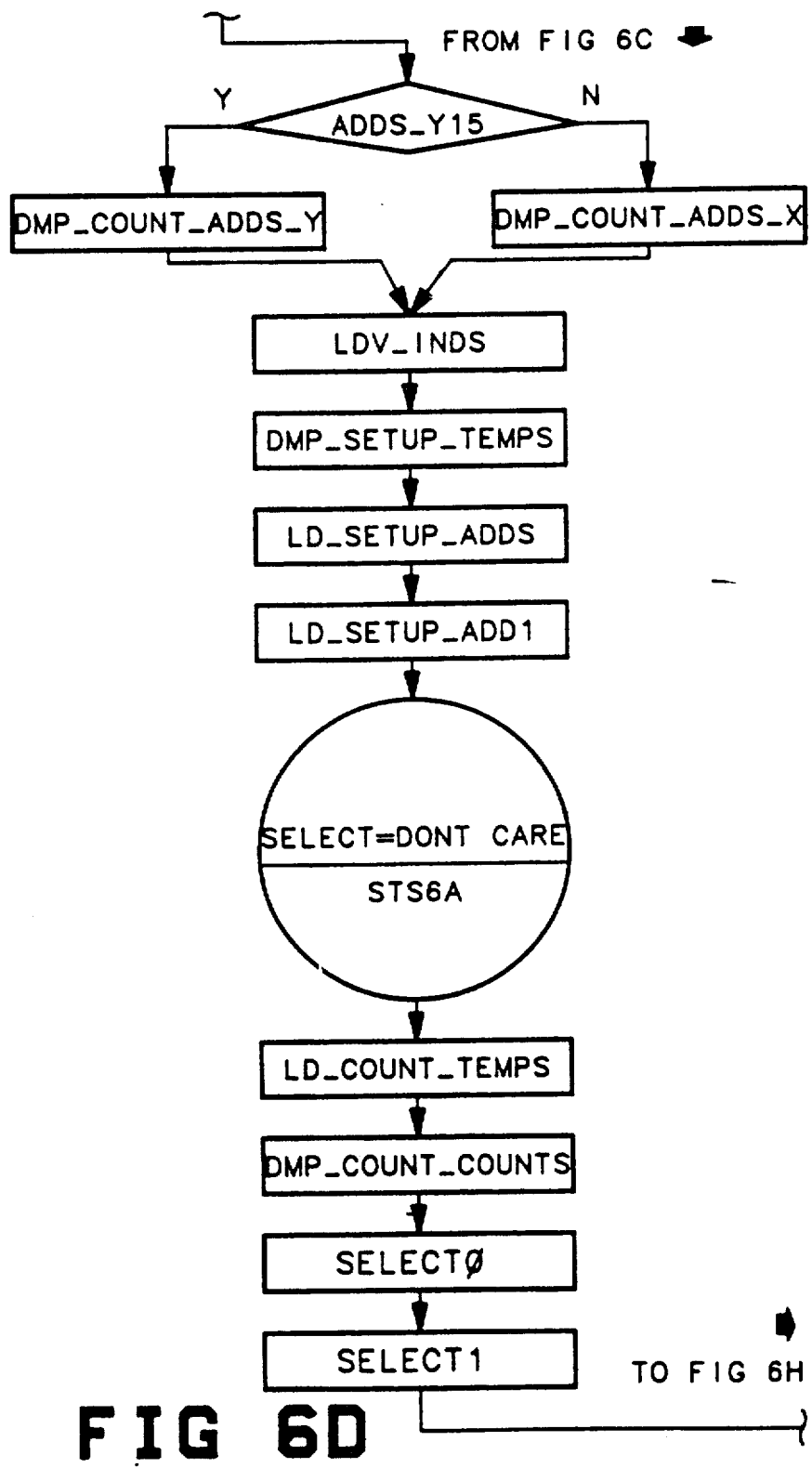
Figure 6E:
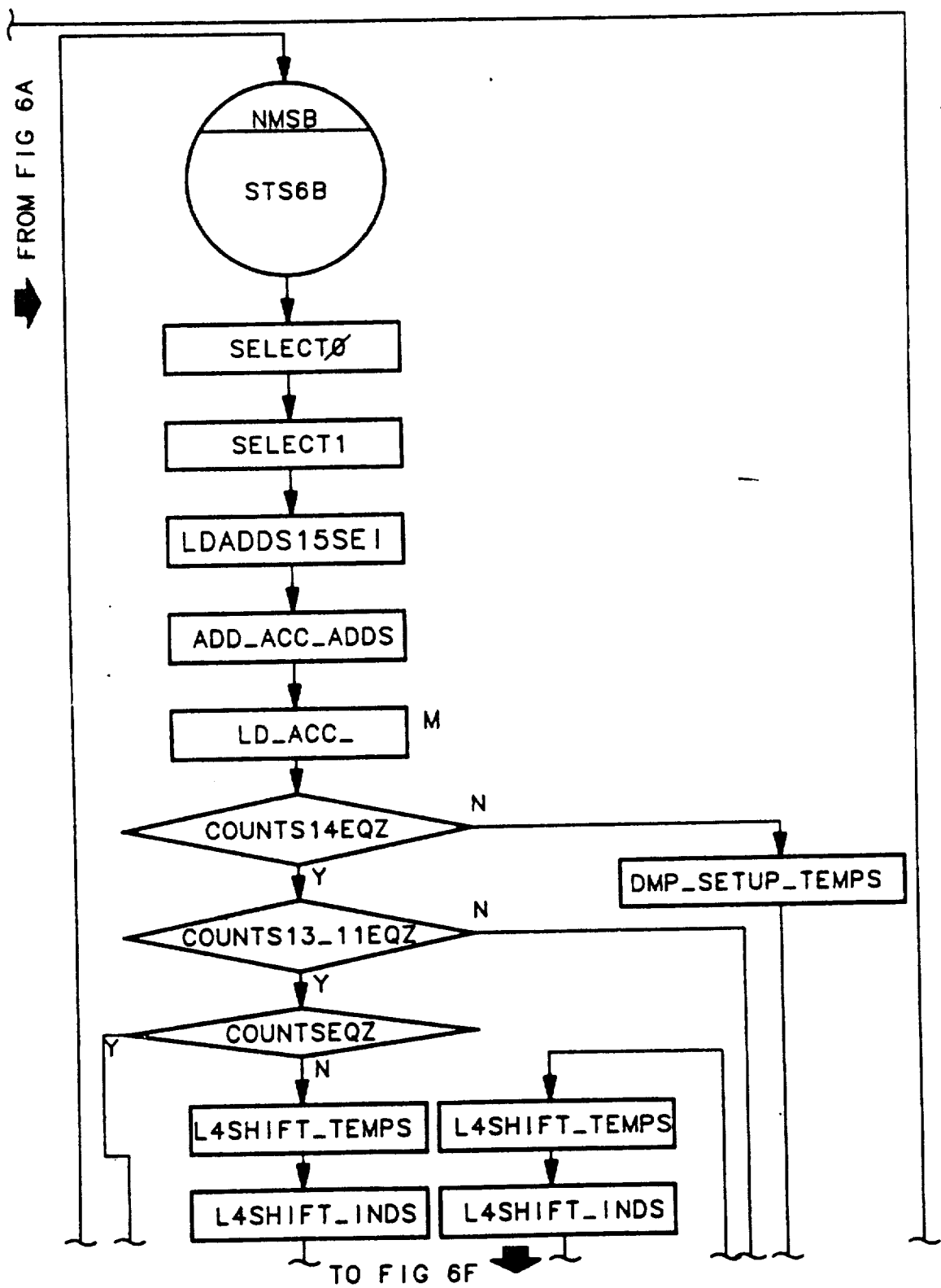
Figure 6H:
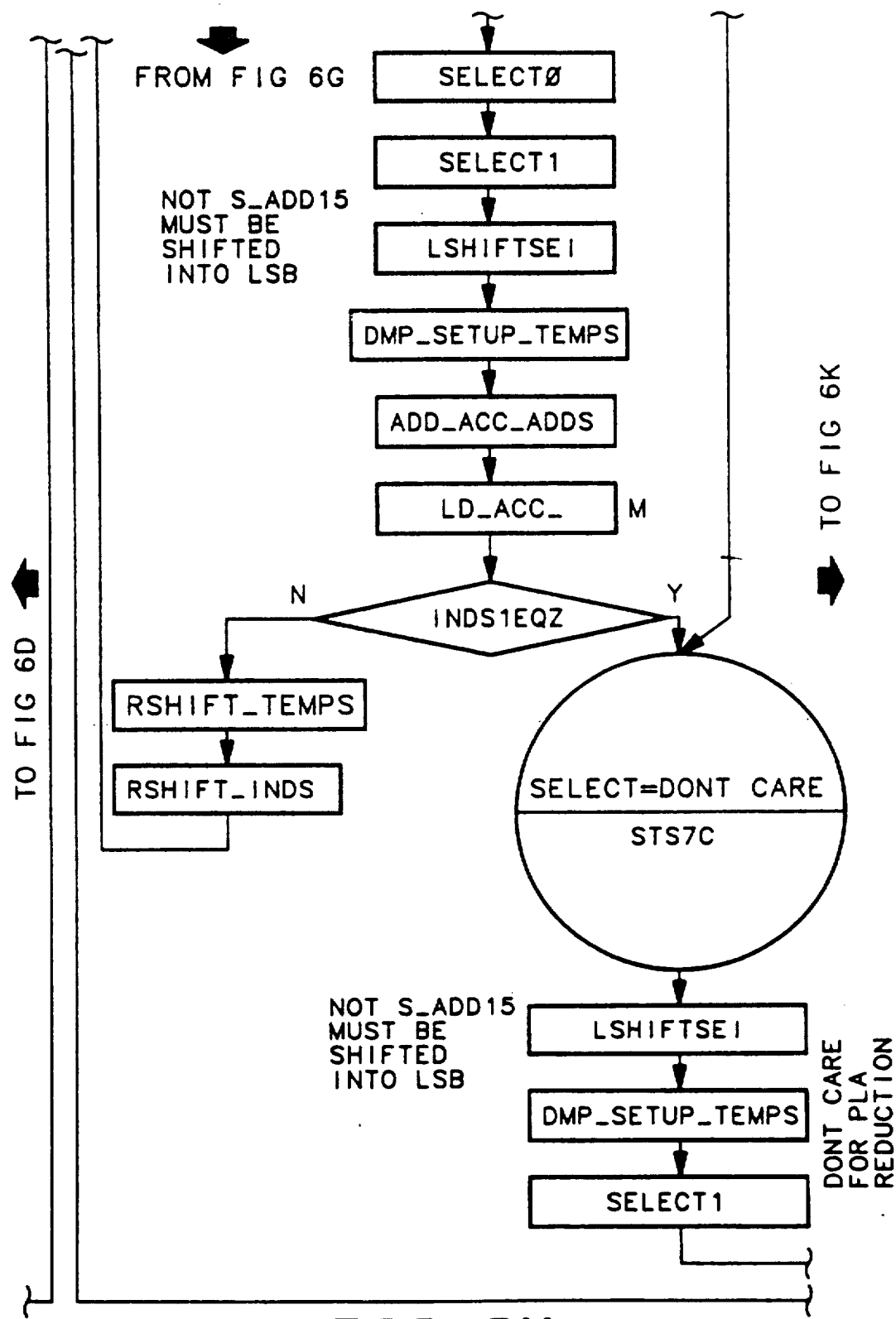
Figure 6I:
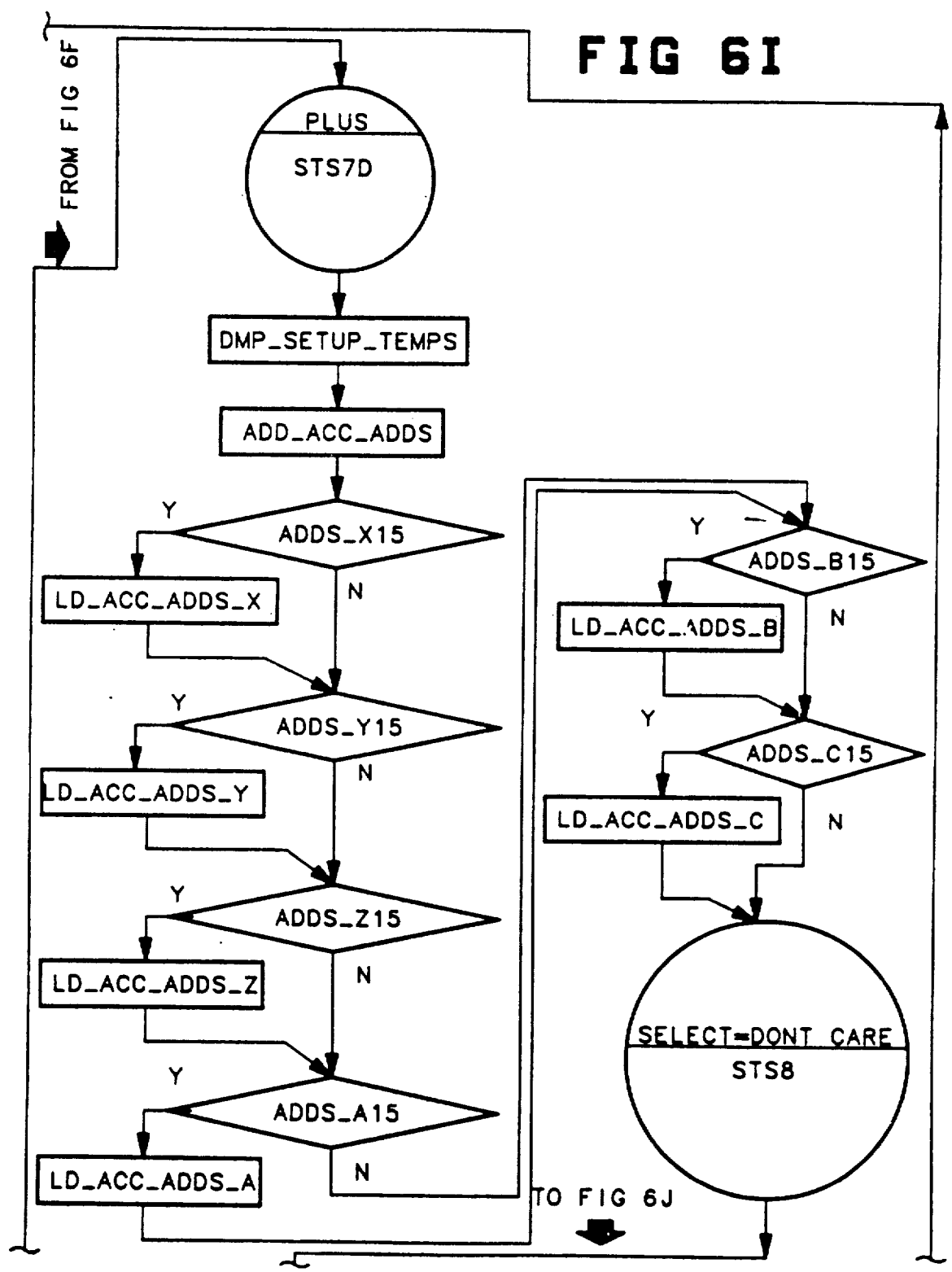
Figure 6J:
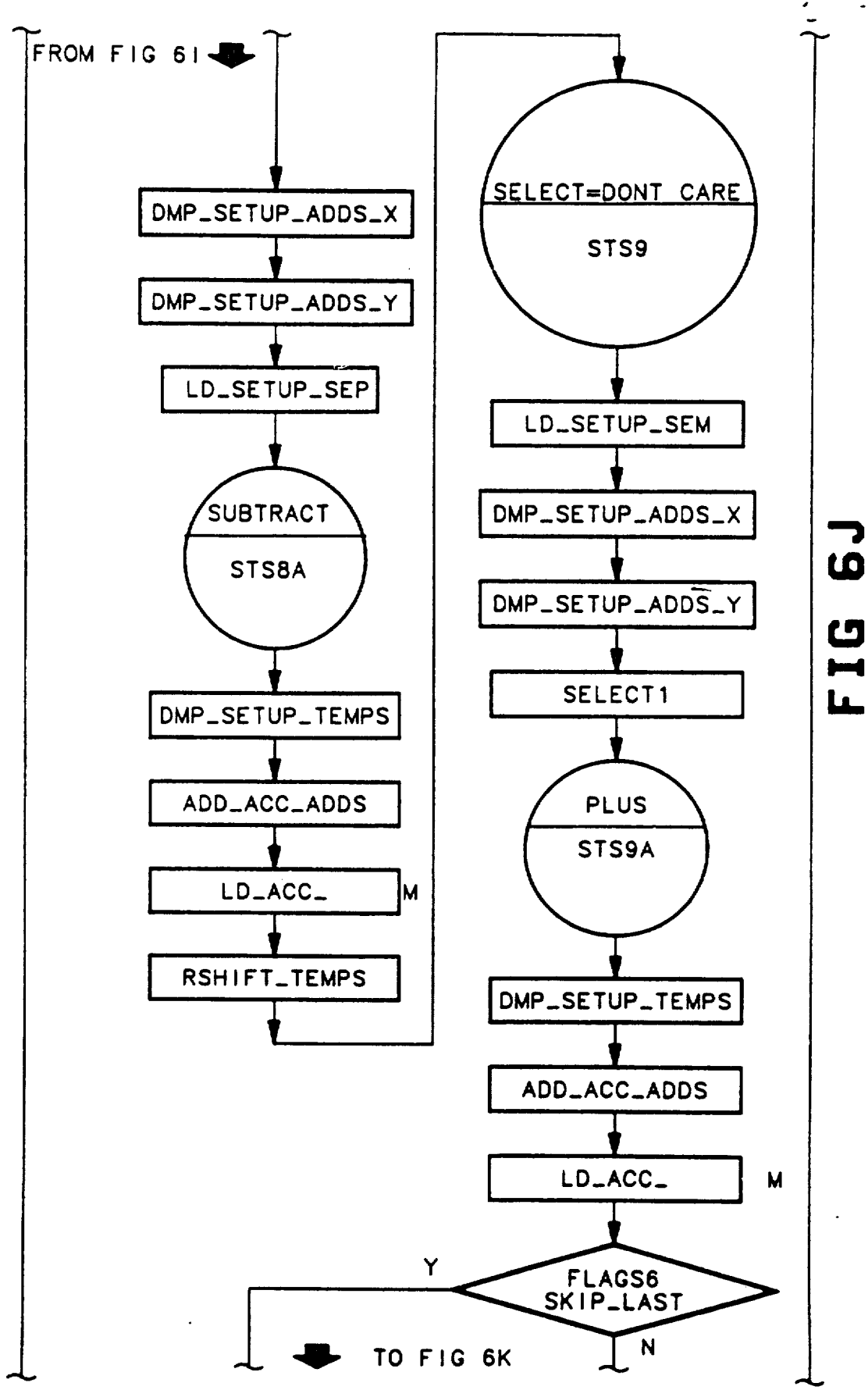
Figure 6K:
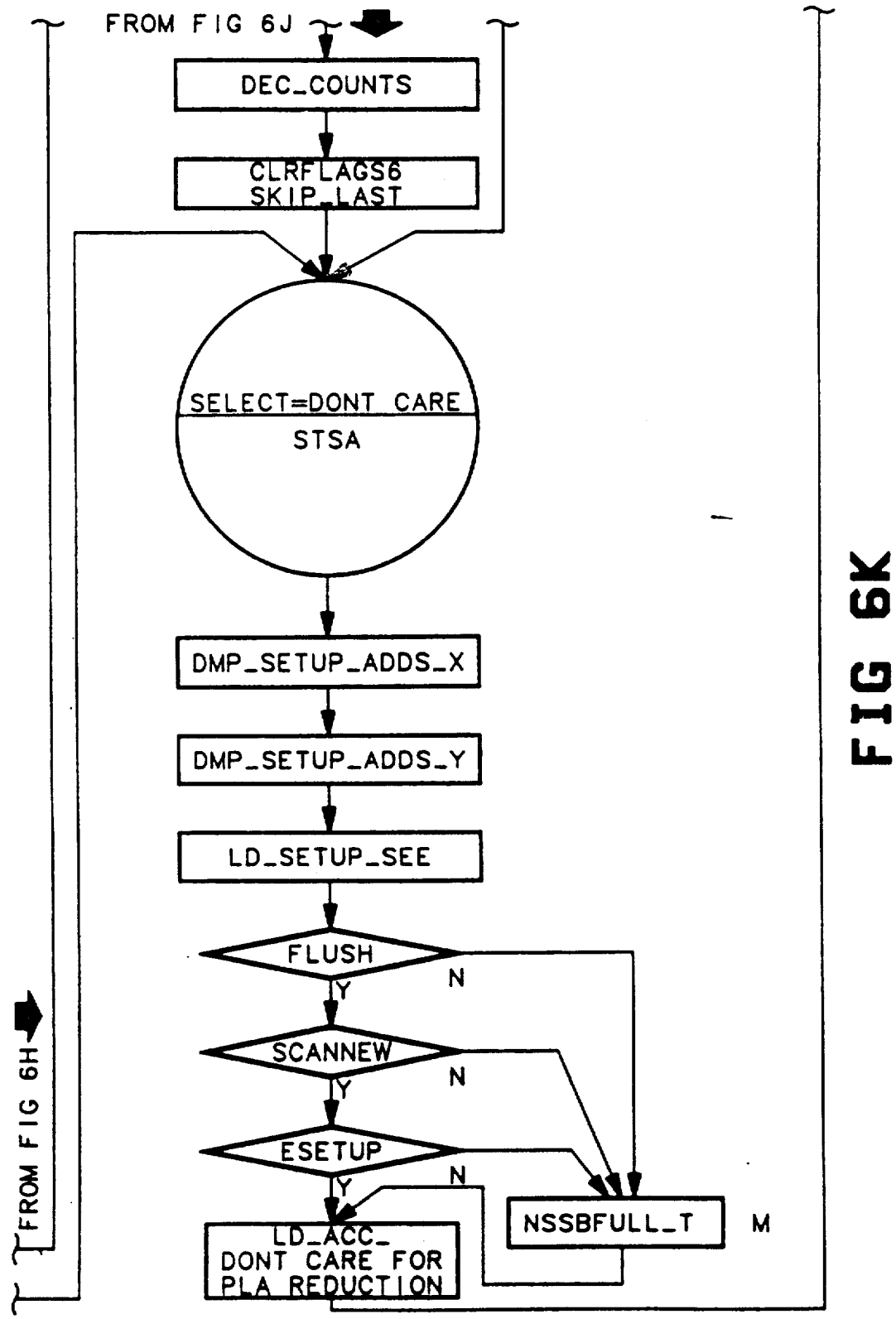
Figure 7A:
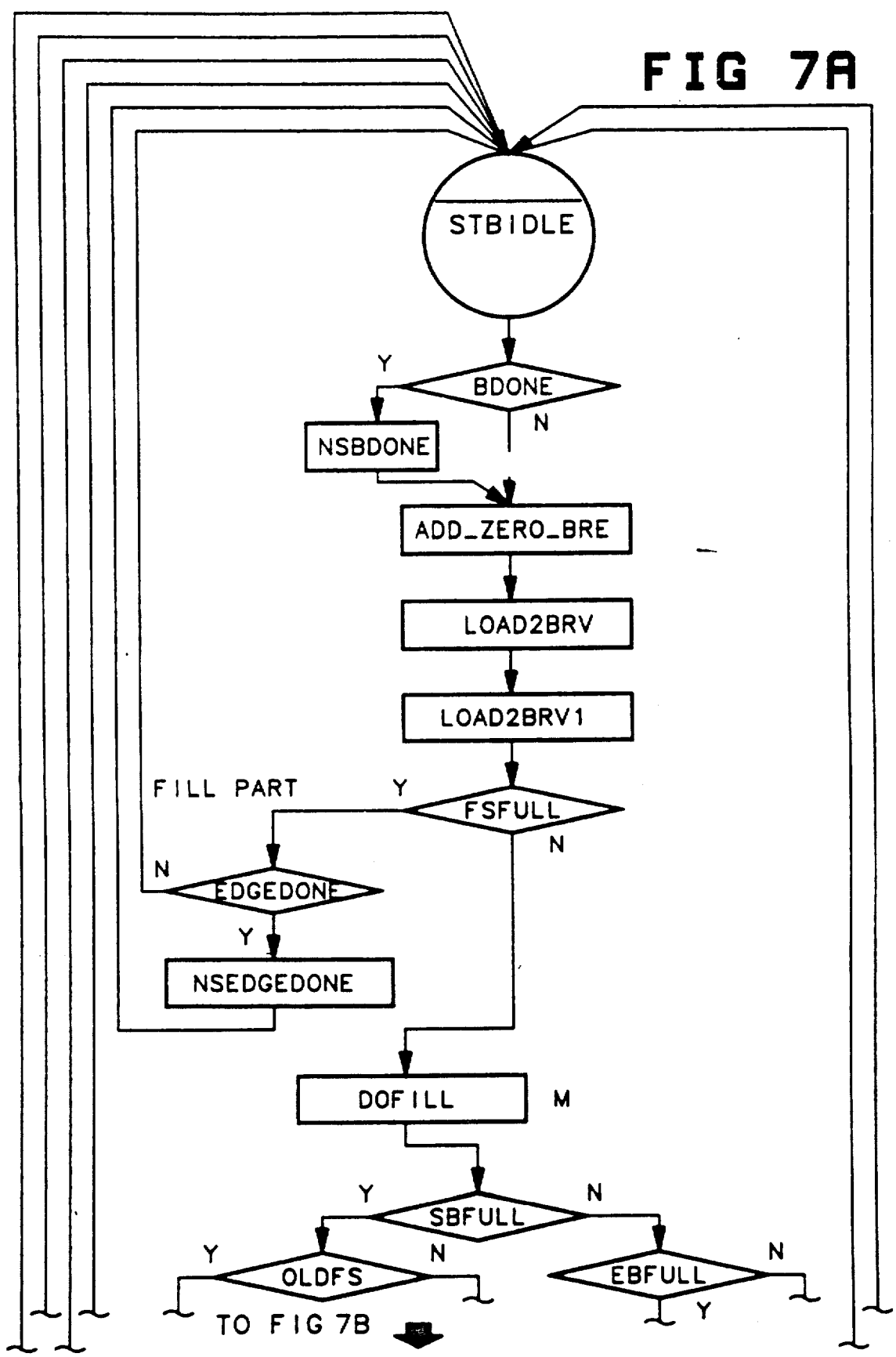
Figure 7B:
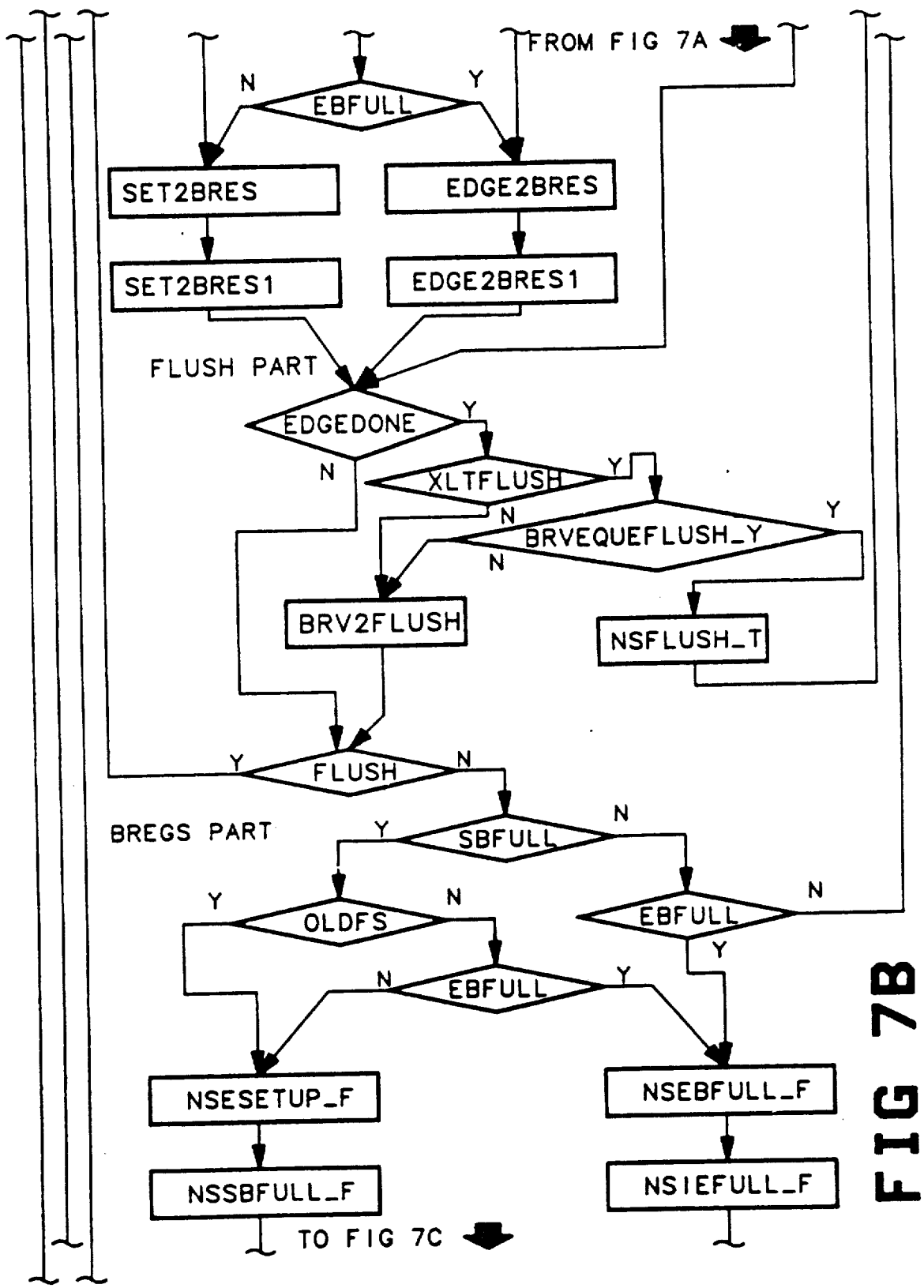
Figure 7C:
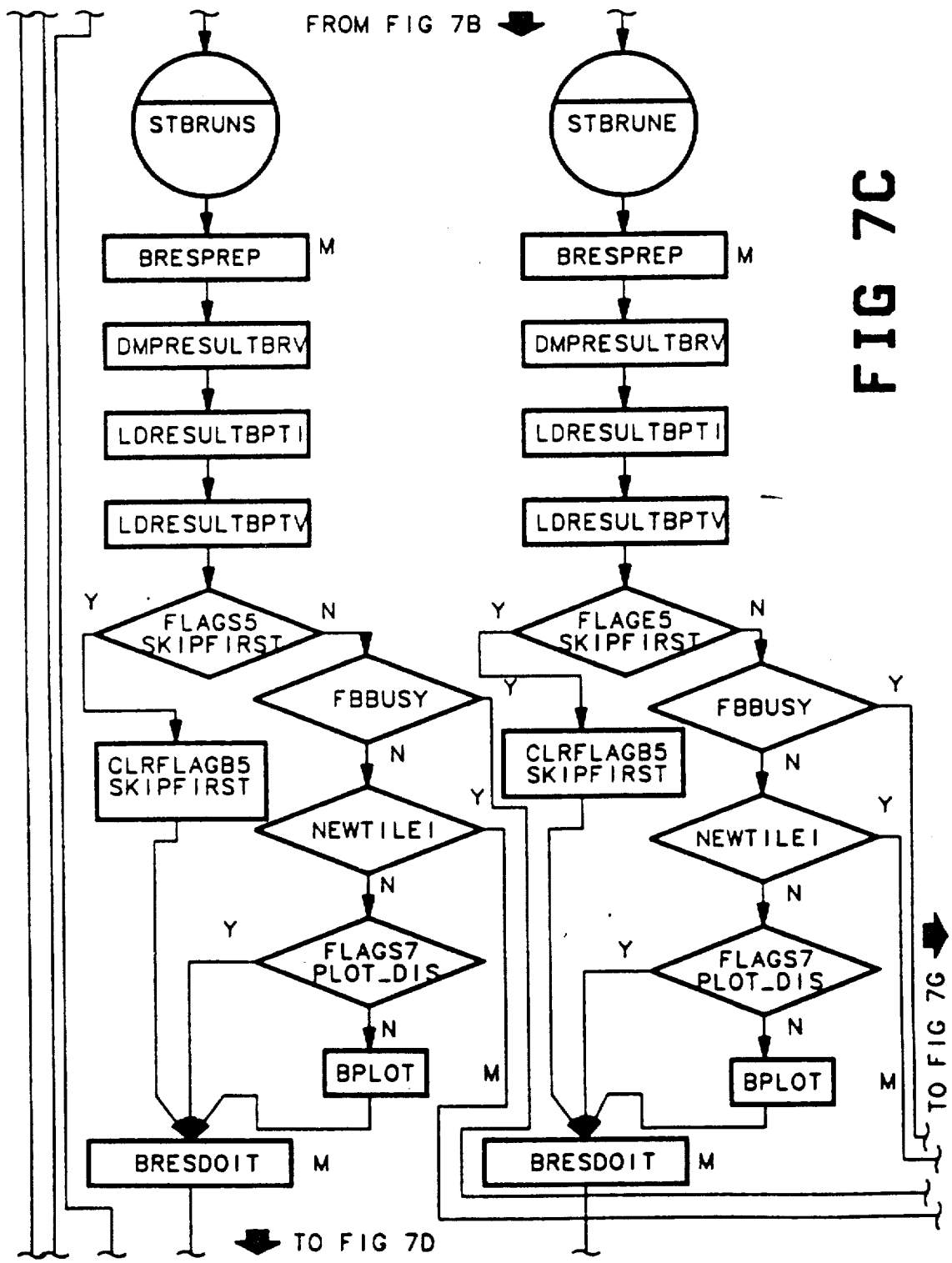
Figure 7D:
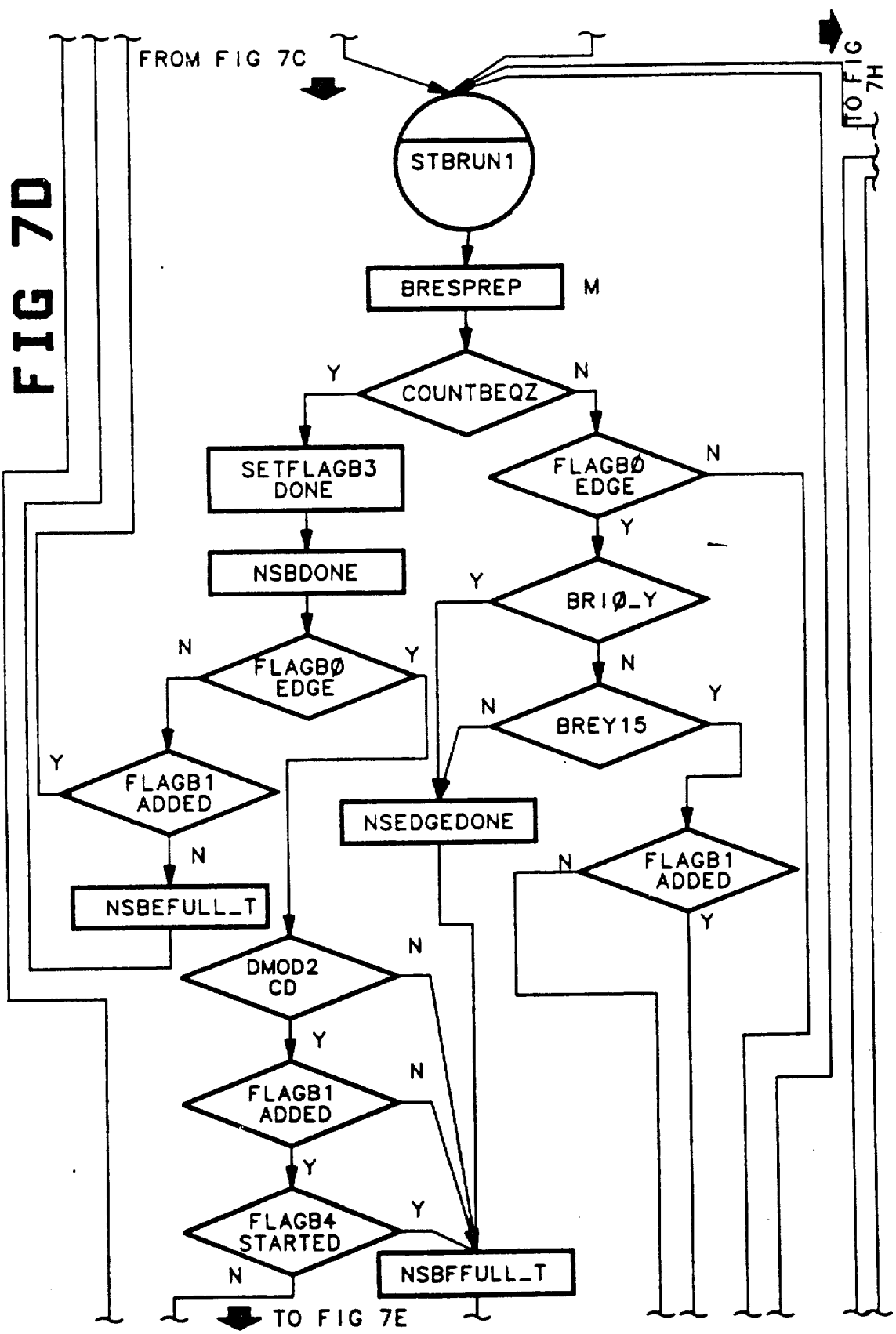
Figure 7E:
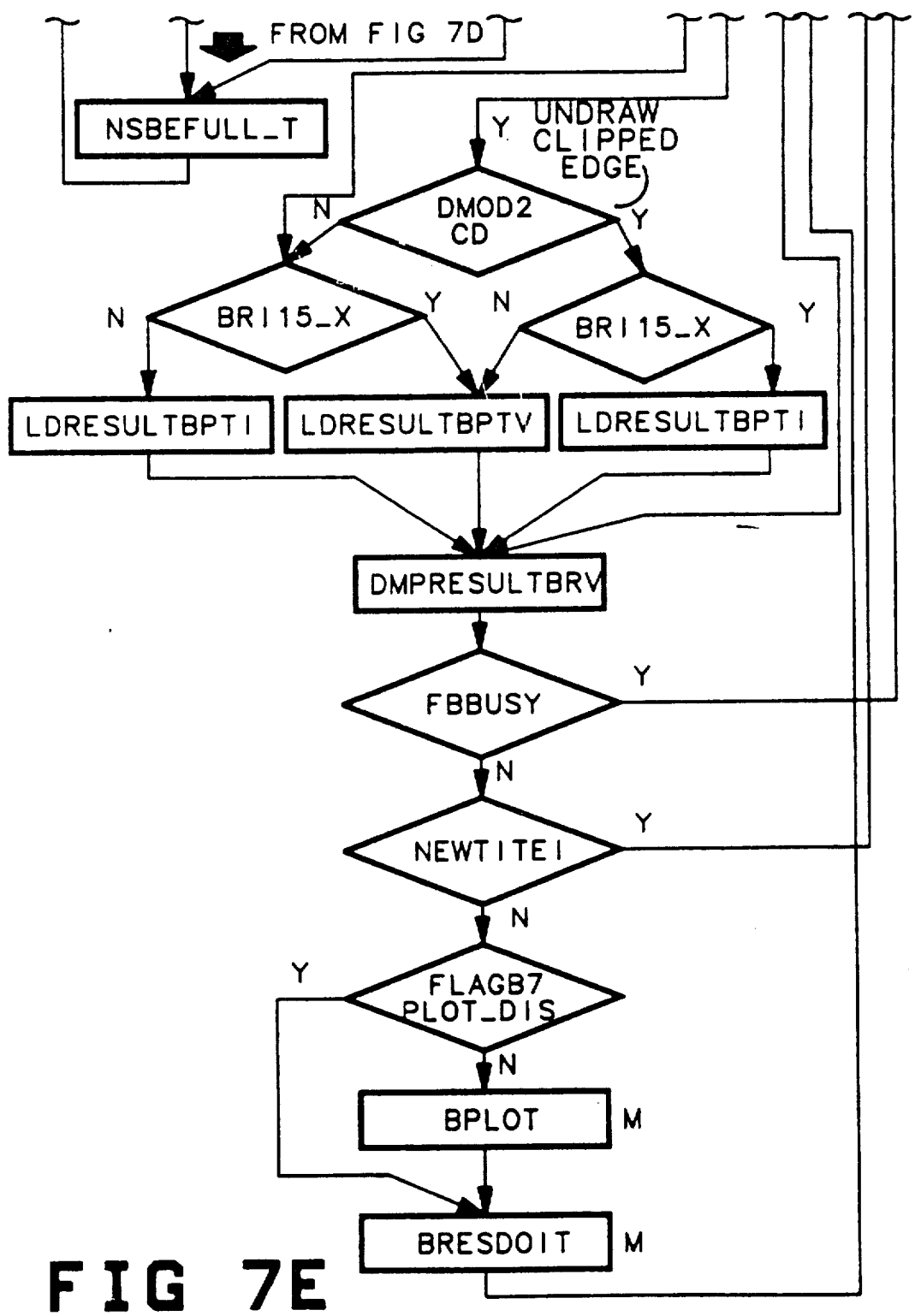
Figure 7F:
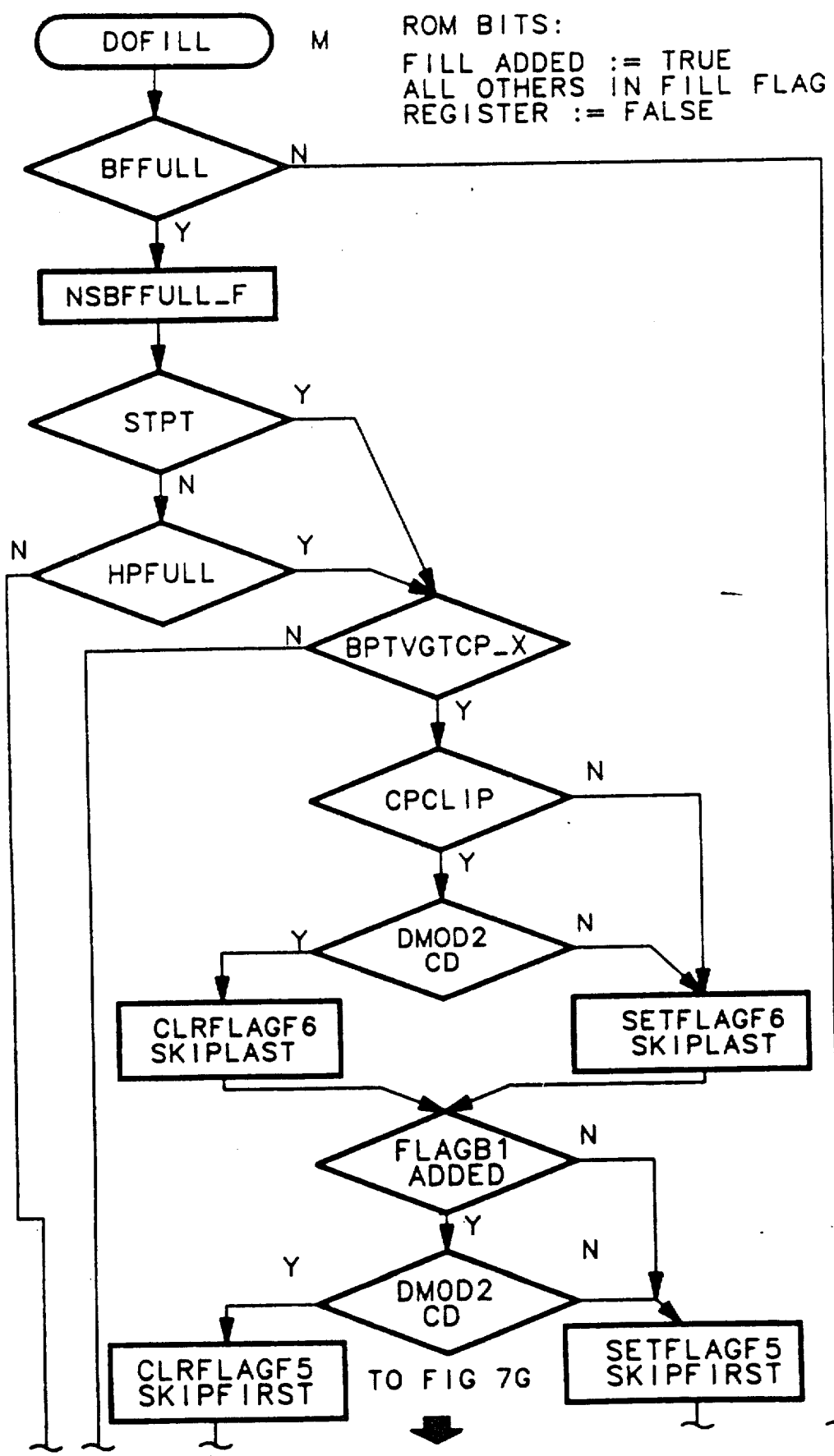
Figure 7G:
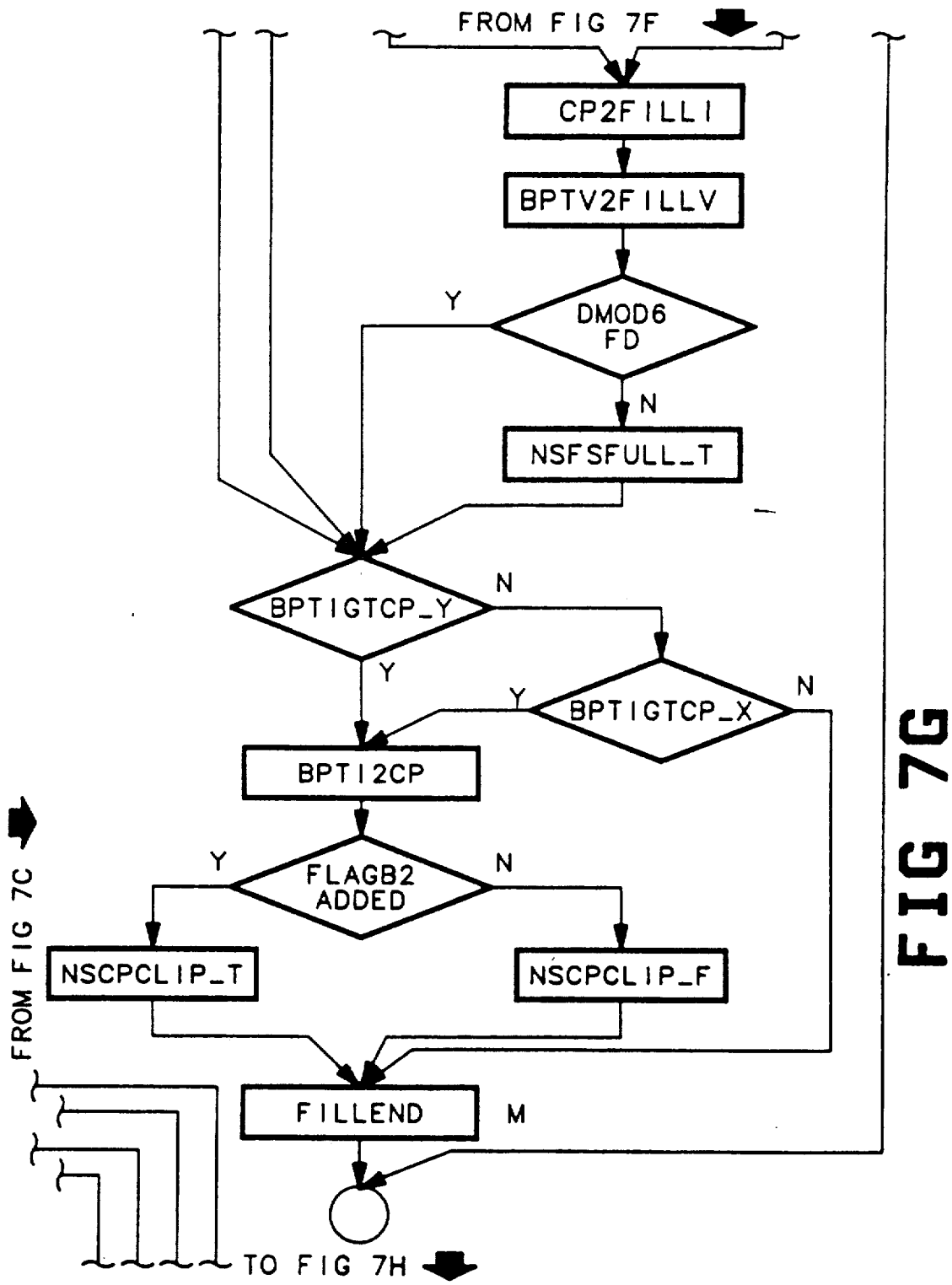
Figure 7H:
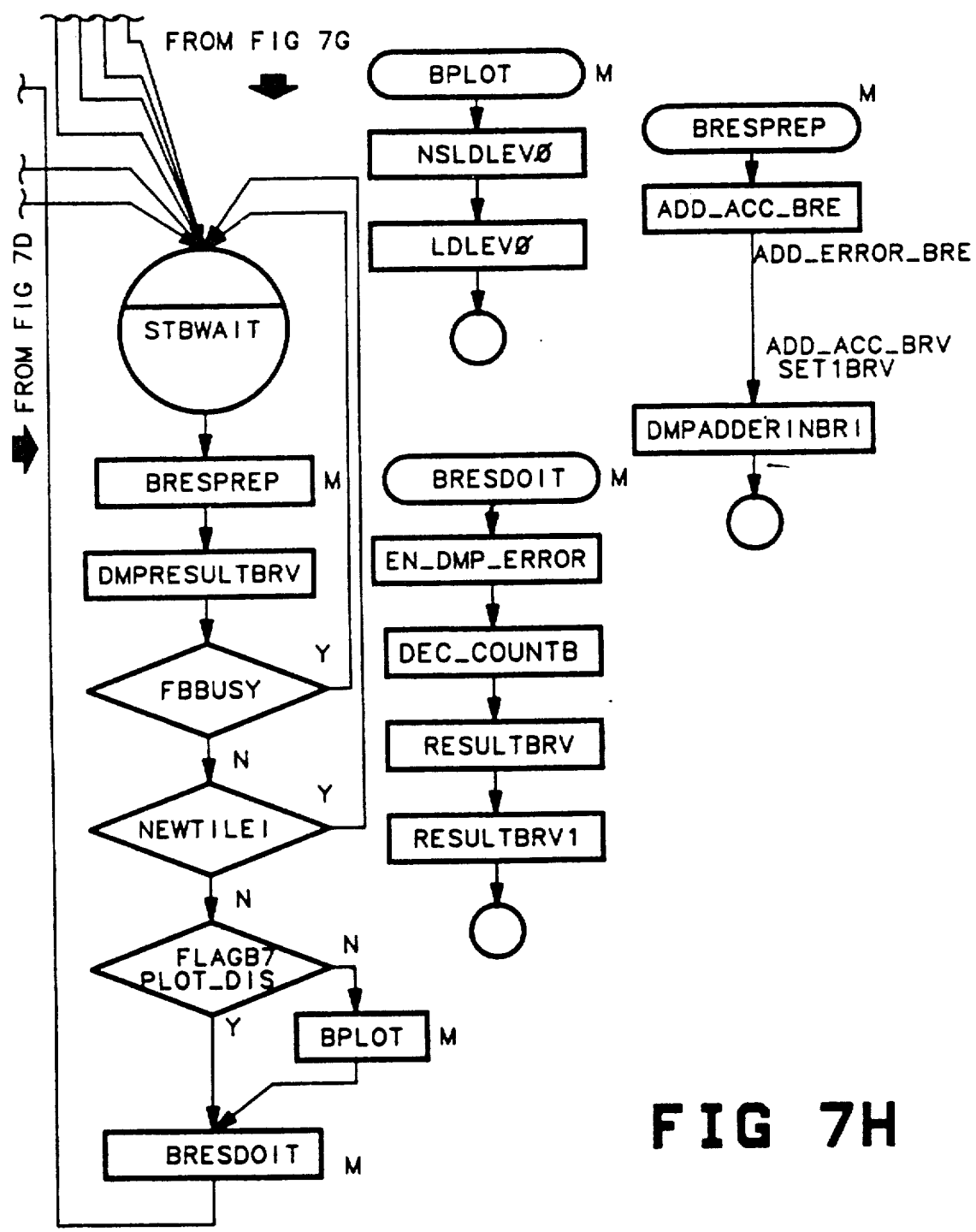
Figure 7I:
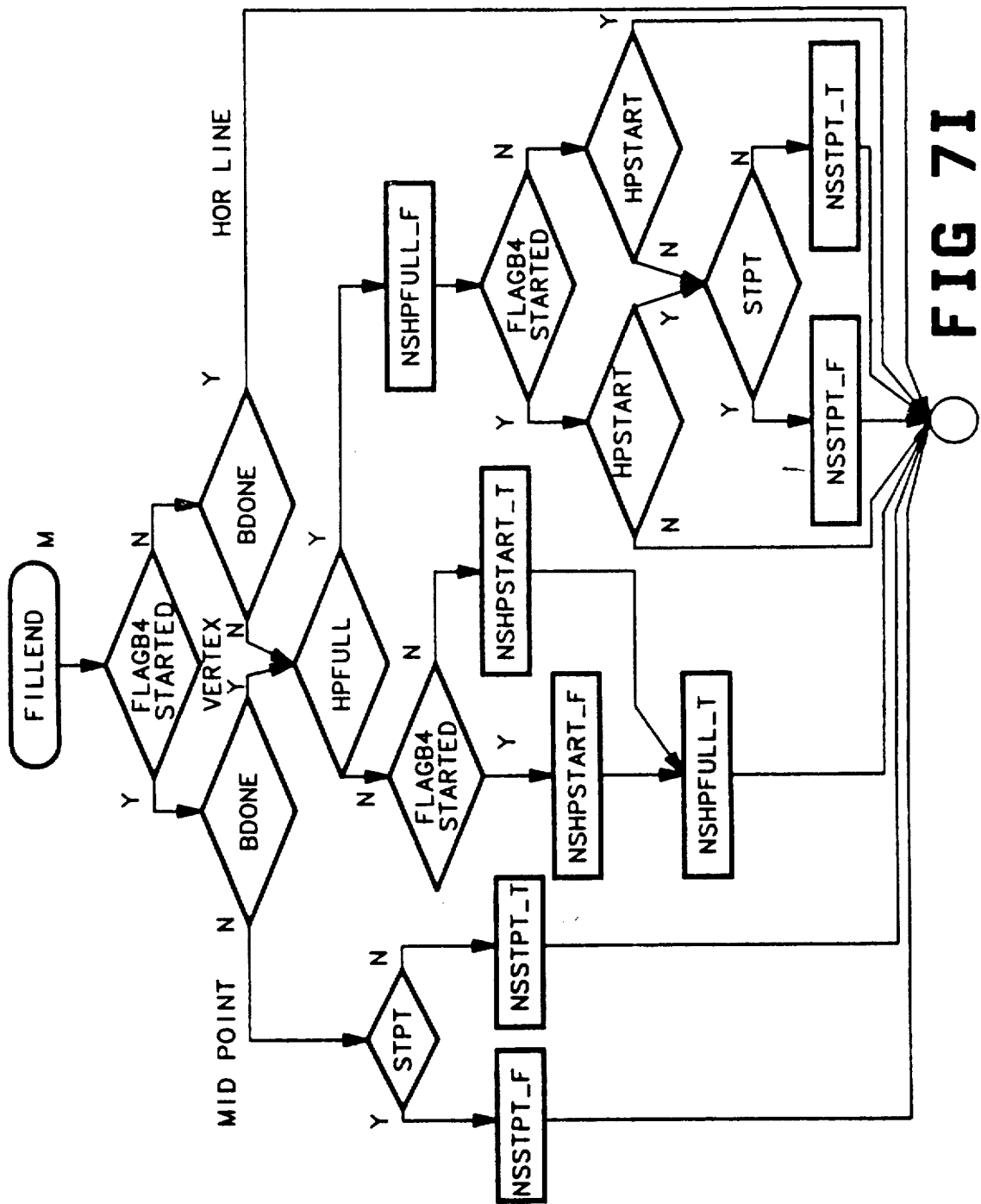

To conclude the disclosure, FIG. 6 is a detailed state diagram of a state machine (not shown) that controls the six instances of the SETUP machines in the PRC. One state machine synchronously controls all six SETUP machines. FIG. 7 is a similar state diagram for the six instances of the INTERPOLATOR machines in the PRC. While those diagrams contain much detail about activity peripheral to the disclosure of the method, the method and its hardware implementation are completely described by those state diagrams. The notations used are consistent with that of FIGS. 2-5 and Appendices A and B. For examples the "LD_SETUP_ADDS" of state STSIDLE in FIG. 6 means "load ADDS from the bus NSETUP." Bus names have sometimes been abbreviated, but not register names.

APPENDIX A/PART 1
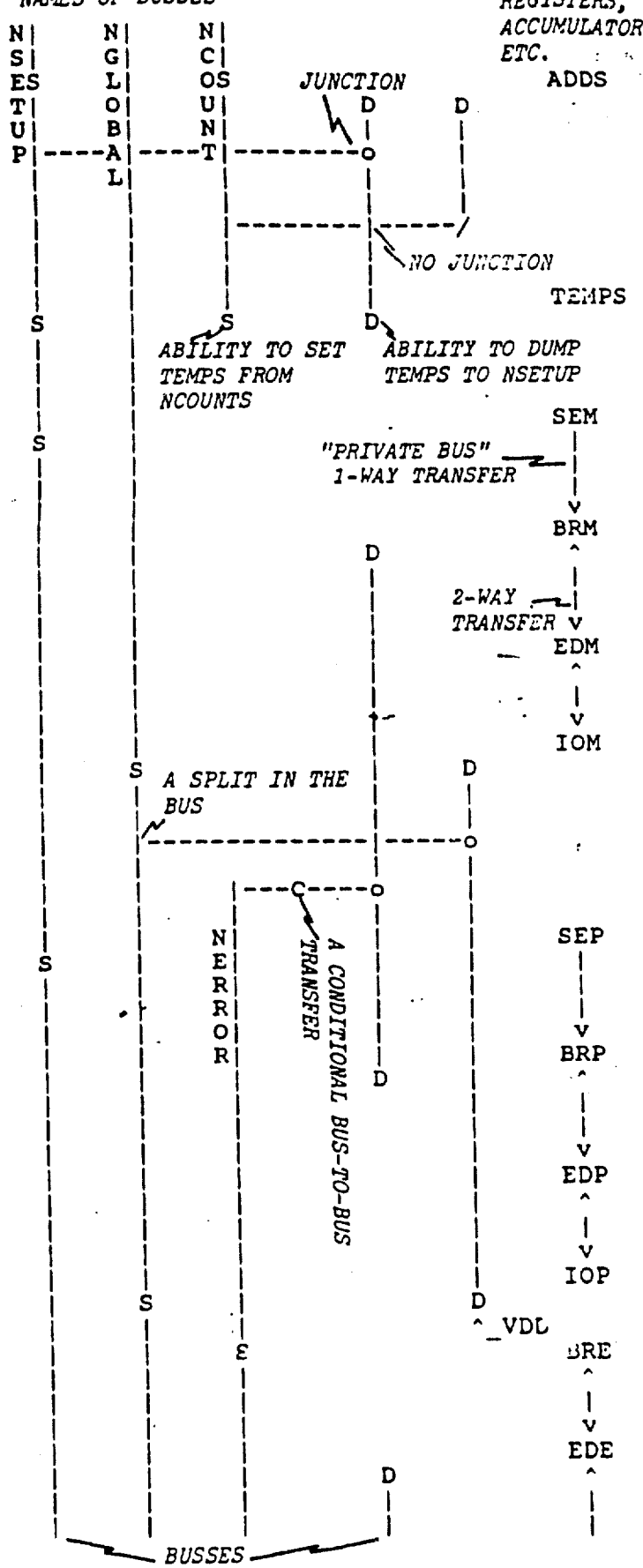

APPENDIX A/PART 2
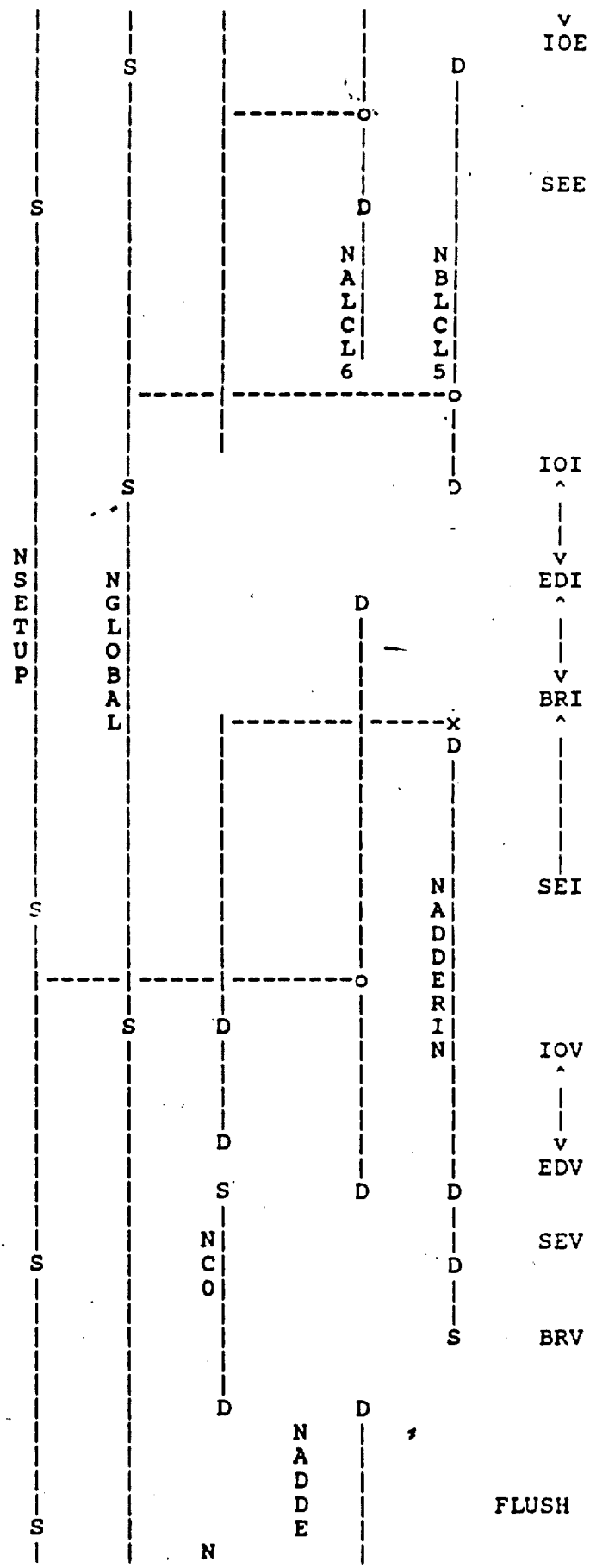

APPENDIX A/PART 3
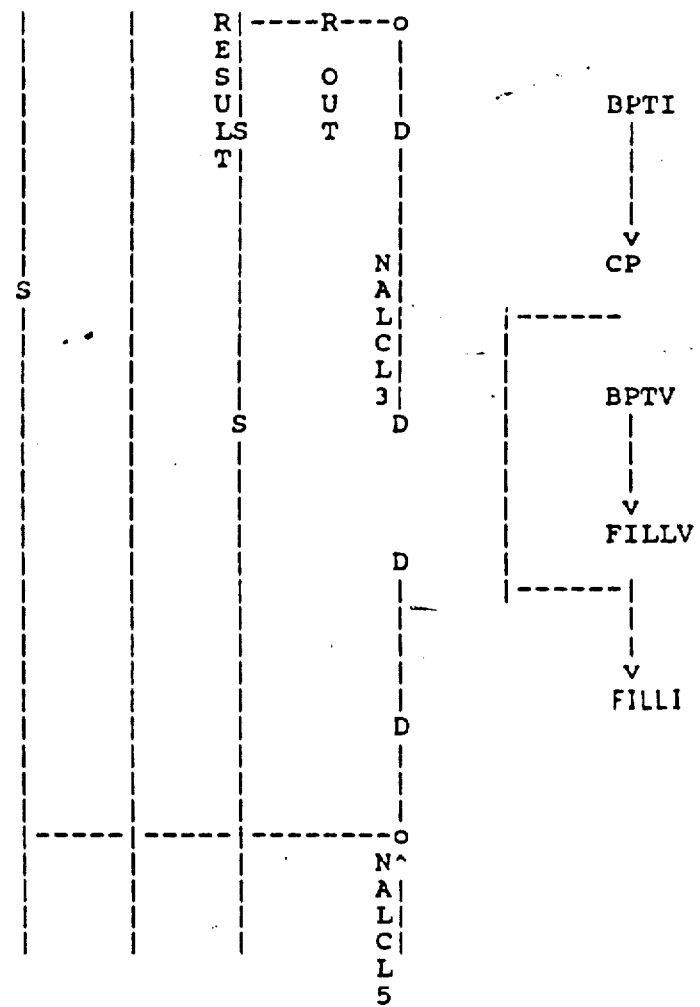

APPENDIX B/PART 1
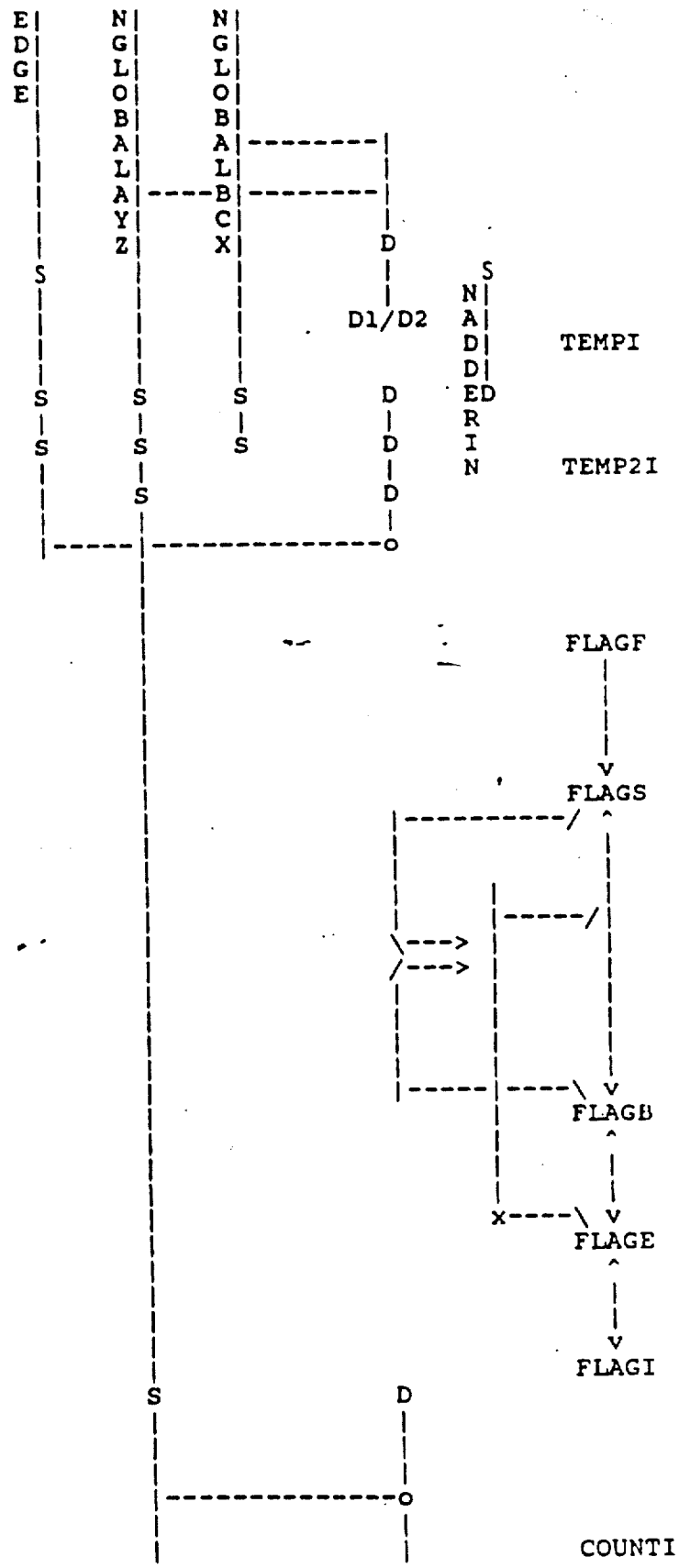

APPENDIX B/PART 2
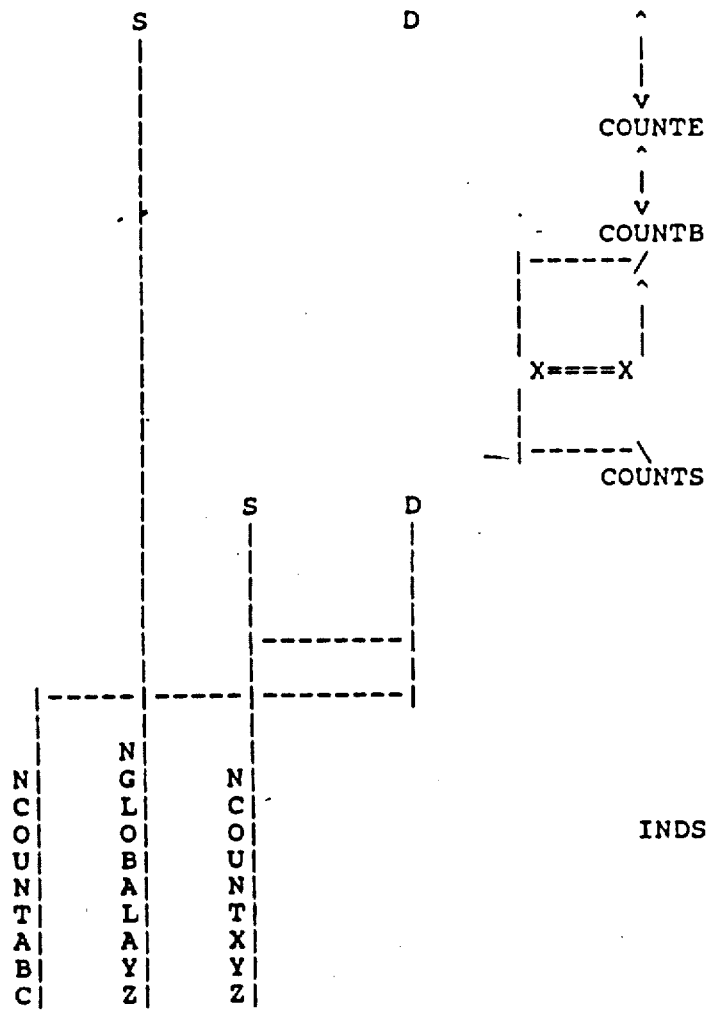

I claim:

1. A method of producing, from input data, pixels having depth components determined by linearly interpolating the integer values of a dependent variable Z representing pixel ordinal position along a depth axis, Z ranging from a given starting ordinal position of value Zs to a given ending ordinal position of value Ze, the interpolating of Z done as an independent variable Z representing pixel ordinal position along a scan line traverses an ordered sequence of integers starting with a value Xs representing a starting ordinal position along the scan line and ending with a value Xe representing an ending ordinal position along the scan line, thus producing a sequence of (X, Z) pairs describing as ordinal positions the physical locations of pixels along the scan line and their associated depths, the method comprising the steps of:

a. finding the ordinal position differences ($\Delta Z = Ze - Zs$ and $\Delta X = Xe - Xs$;
 b. finding an integer quotient Mi and a remainder R by dividing $\Delta Z$ by $\Delta X$;
 c. multiplying the value of R by two to obtain a scaled fractional part Mf;
 d. assigning the initial values $Mf - \Delta X$ to a term Zf and Zs to a term Zi;
 e. assigning the value Xs to a term X;
 f. taking (Xs, Zs) as the first pair in a sequence of (X, Z) pairs, each of which pairs describes the ordinal position along a scan line of a pixel whose ordinal position along a depth axis is Z;
 g. replacing the value of X with the next value in the ordered sequence of integers;
 h. determining if Zf is greater than or equal to zero;
 i. if the outcome in step h is that Zf is greater than or equal to zero then:
 j. adding Mi+1 to Zi; and also
 k. adding $Mf - 2\Delta X$ to Zf;
 l. if the outcome in step h is that Zf is less than zero, then:
 m. adding Mi to Zi; and also
 n. adding Mf to Zf;
 o. taking (X, Zi) as the next pair in the sequence of (X, Z) pairs;
 p. repeating steps g through o until they have been performed with X equal to Xe;
 q. generating a scan line composed of pixels whose ordinal positions thereon and on the depth axis are determined by the sequence of (X, Z) pairs; and
 r. illuminating each pixel in the scan line of step q, by an amount ranging from fully on to fully off, the amount determined in accordance with the Z component of that pixel's (X, Z) pair.

2. A method of interpolating pixels between the starting pixel (S, U) and ending pixel (T, V) of a vector composed of a ordered collection of pixels to produce a series of integer pixel values in one-to-one correspondence with unit steps along a pixel position axis, the vector beginning with a pixel having an integer starting position S whose associated pixel value is an integer U and ending at a pixel having an integer terminal position T whose associated pixel value is an integer V, the method comprising the steps of:

dividing the difference in pixel values $U - V$ by the distance $T - S$ in unit steps along the pixel position axis to find an integer quotient Q and an integer remainder R;
 doubling the value of R;
 taking U as the first integer value in the series;
 accumulating by adding the doubled value of R to an accumulation whose initial value is $-(T - S)$; followed by
 reducing the value of the accumulation by twice the value of $T - S$ and incrementing the previous integer value in the series by $Q + 1$ whenever the value of the accumulation equals or exceeds the value $T - S$; otherwise
 alternatively incrementing the previous integer value in the series by Q;
 producing the incremented previous integer value as the next integer value in the series;
 repeating the accumulating, reducing, alternatively incrementing and producing steps until a value V is obtained in the producing step corresponding to the ending pixel (T, V);
 generating a scan line composed of an ordered sequences of pixels along the pixel axis and including interpolated pixels corresponding to the series of integer pixel values; and
 illuminating each pixel in the scan line by an amount determined by that pixel's integer pixel value.

3. A method as in claim 2 wherein R is expressed in binary and the step of doubling the value of R comprises a left shift of bits representing R.

4. A method of interpolating pixels between the starting pixel (S, U) and ending pixel (T, V) of a vector composed of a ordered collection of pixels to produce a series of integer pixel values in one-to-one correspondence with unit steps along a pixel position axis, the vector beginning with a pixel having an integer starting position S whose associated pixel value is an integer U and ending at a pixel having an integer terminal position T whose associated pixel value is an integer V, the method comprising the steps of:

dividing the difference in pixel values $U - V$ by the distance $T - S$ in unit steps along the pixel position axis to find an integer quotient Q and an integer remainder R;
 doubling the value of R;
 determining a constant K equal to twice R diminished by twice the distance $T - S$ in unit steps;
 taking U as the first integer value in the series;
 accumulating by adding the doubled value of R to an accumulation, whose initial value is $2R - (T - S)$, if the value of the accumulation is negative; otherwise
 alternatively accumulating by adding K to the accumulation;
 incrementing the previous integer value in the series by Q when the accumulating step is performed; otherwise
 alternatively incrementing the previous integer value in the series by $Q + 1$ when the alternatively accumulating step is performed;
 producing the incremented previous integer value as the next integer value in the series;
 repeating the accumulating, alternatively, accumulating, incrementing, alternatively incrementing and producing steps until a value V is obtained in the producing step corresponding to the ending pixel (T, V);
 generating a scan line composed of an ordered sequences of pixels along the pixel axis and including interpolated pixels corresponding to the series of integer pixel values; and
 illuminating each pixel in the scan line by an amount determined by that pixel's integer pixel value.

5. A method as in claim 4 wherein R is expressed in binary and the step of doubling the value of R comprises a left shift of bits representing R.

6. A method of producing, from input data, a plurality of scan lines composed of pixels having physical locations therein determined by linearly interpolating the integer values of a dependent variable Y representing pixel membership in one of the plurality of scan lines, Y ranging from a given starting ordinal position of value Ys to a given ending ordinal position of value Ye, the interpolating of Y done as an independent variable X representing pixel ordinal position along a scan line traverses an ordered sequence of integers starting with a value Xs representing a starting ordinal position along the scan line and ending with a value Xe representing an ending ordinal position along the scan line, thus producing a sequence of (X, Y) pairs describing as ordinal positions the physical locations of pixels in the plurality of scan lines, the method comprising the steps of:
 a. finding the ordinal position differences $\Delta Y = Ye - Ys$ and $\Delta X = Xe - Xs$;
 b. finding an integer quotient Mi and a remainder R by dividing $\Delta Y$ by $\Delta X$;
 c. multiplying the value of R by two to obtain a scaled fractional part Mf;
 d. assigning the initial values $Mf - \Delta X$ to a term Yf and Ys to a term Yi;
 e. assigning the value Xs to a term X;
 f. taking (Xs, Ys) as the first pair in a sequence of (X, Y) pairs, each of which pairs describes the ordinal position X of a pixel along a scan line whose ordinal position within a plurality of such scan lines is Y;
 g. replacing the value of X with the next value in the ordered sequence of integers;
 h. determining if Yf is greater than or equal to zero;
 i. if the outcome in step h is that Yf is greater than or equal to zero then:
  j. adding $Mi + 1$ to Yi; and also
  k. adding $Mf - 2\Delta X$ to Yf;
 l. if the outcome in step h is that Yf is less than zero, then:
  m. adding Mi to Yi; and also
  n. adding Mf to Yf;
 o. taking (X, Yi) as the next pair in the sequence of (X, Y) pairs;
 p. repeating steps g through o until they have been performed with X equal to Xe;
 q. subsequent to step p, generating a plurality of output scan lines composed of pixels whose ordinal positions within that plurality are determined by (X, Y) pairs within the sequence of (X, Y) pairs; and
 r. illuminating pixels within the plurality of the output scan line.

7. A method of producing, from input data, pixels having individual intensities determined by linearly interpolating the integer values of a dependent variable I representing pixel intensity, I ranging from a given starting value Is to a given ending value Ie, the interpolating of I done as an independent variable X representing pixel position along a scan line traverses an ordered sequence of integers starting with a value Xs representing a starting ordinal position along the scan line and ending with a value Xe representing an ending ordinal position along the scan line, thus producing a sequence of (X, I) pairs describing individual pixel intensities for sequence of pixels along a scan line, the method comprising the steps of:
 a. finding the intensity difference $\Delta I = Ie - Is$ and the pixel position difference $\Delta X = Xe - Xs$;
 b. finding an integer quotient Mi and a remainder R by dividing $\Delta I$ by $\Delta X$;
 c. multiplying the value of R by two to obtain a scaled fractional part Mf;
 d. assigning the value $Mf - \Delta X$ to a term If and Is to a term Ii;
 e. assigning the value Xs to a term X;
 f. taking (Xs, Is) as the first pair in a sequence of (X, I) pairs, each of which pairs describes the individual intensity of a pixel in the Xth position of a scan line;
 g. replacing the value of X with the next value in the ordered sequence of integers;
 h. determining if If is greater than or equal to zero;
 i. if the outcome in step h is that If is greater than or equal to zero then:
  j. adding $Mi + 1$ to Ii; and also
  k. adding $Mf - b\,2\Delta X$ to If;
 l. if the outcome in step h is that If is less than zero, then:
  m. adding Mi to Ii; and also
  n. adding Mf to If;
 o. taking (X, Ii) as the next pair in the sequence of (X, I) pairs;
 p. repeating steps g through o until they have been performed with X equal to Xe;
 q. generating a scan line composed of pixels whose pixel positions and individual intensities are determined by the sequence of (X, I) pairs; and
 r. illuminating each pixel in the scan line of step q by an amount determined in accordance with the I component of that pixel's (X, I) pair.

* * * * *